(12) United States Patent
Kushida

(10) Patent No.: US 8,773,510 B2
(45) Date of Patent: Jul. 8, 2014

(54) CONTROL DEVICE, CONTROL METHOD AND CONTROL PROGRAM

(75) Inventor: Hidenori Kushida, Kanagawa (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 13/332,579

(22) Filed: Dec. 21, 2011

(65) Prior Publication Data

US 2012/0162383 A1 Jun. 28, 2012

(30) Foreign Application Priority Data

Dec. 28, 2010 (JP) ................................ 2010-293359

(51) Int. Cl.
*H04N 13/02* (2006.01)

(52) U.S. Cl.
USPC .......................................................... 348/47

(58) Field of Classification Search
CPC ..... H04N 5/00; H04N 13/00; H04N 13/0007; H04N 13/0239; H04N 13/0285
See application file for complete search history.

(56) References Cited

U.S. PATENT DOCUMENTS

2007/0115459 A1* 5/2007 Nakao et al. .................. 356/213
2011/0141297 A1* 6/2011 Orimoto et al. ............ 348/208.4

FOREIGN PATENT DOCUMENTS

JP 2010-154478 A 7/2010

* cited by examiner

*Primary Examiner* — Huy T Nguyen
(74) *Attorney, Agent, or Firm* — Sony Corporation

(57) ABSTRACT

A control device includes: a determination unit determining which mode is designated in a single-eye imaging mode in which imaging is performed by using a single imaging unit obtaining an image signal by imaging an object by an imaging device and a compound-eye imaging mode in which imaging is performed by using plural imaging units; and a gain maximum value control unit changing a gain maximum value which is the maximum value of the gain of the image signal based on the determination result by the determination unit.

18 Claims, 14 Drawing Sheets

ENTIRE CONFIGURATION OF IMAGING APPARATUS ACCORDING TO FIRST AND SECOND EMBODIMENTS

FUNCTIONAL CONFIGURATIONS OF DIGITAL SIGNAL PROCESSING UNIT AND SYSTEM CONTROLLER ACCORDING TO FIRST EMBODIMENT

VARIATION OF OPTICAL AXIS INTERVAL

CASE OF NARROW OPTICAL AXIS INTERVAL

CASE OF WIDE OPTICAL AXIS INTERVAL

VARIATION OF CONVERGENCE ANGLE

CASE OF NARROW CONVERGENCE ANGLE

CASE OF WIDE CONVERGENCE ANGLE

PROGRAM DIAGRAMS OF EXPOSURE CONTROL AMOUNT AND RESPECTIVE DEVICE CONTROL AMOUNTS

SCENE WITH SMALL STEREOSCOPIC EFFECT AND SCENE WITH
LARGE STEREOSCOPIC EFFECT
FIG.6A
SCENE WITH SMALL STEREOSCOPIC EFFECT
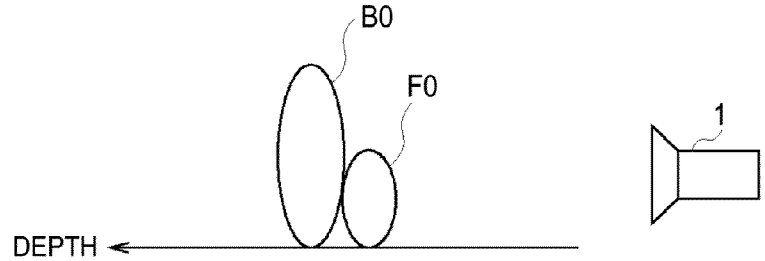
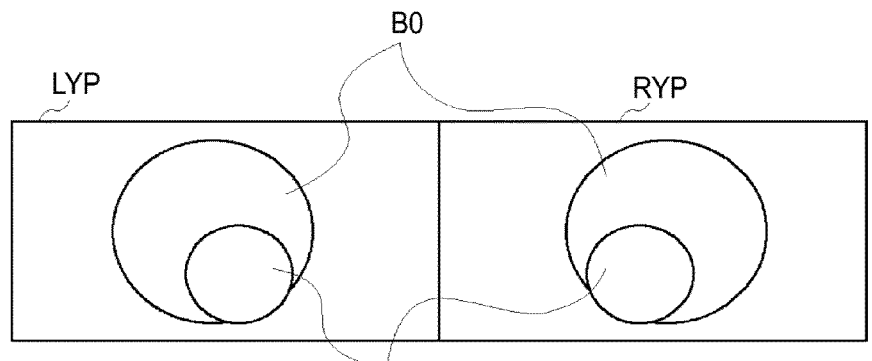
FIG.6B
SCENE WITH LARGE STEREOSCOPIC EFFECT
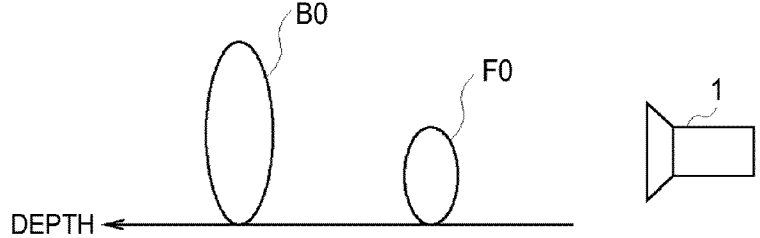
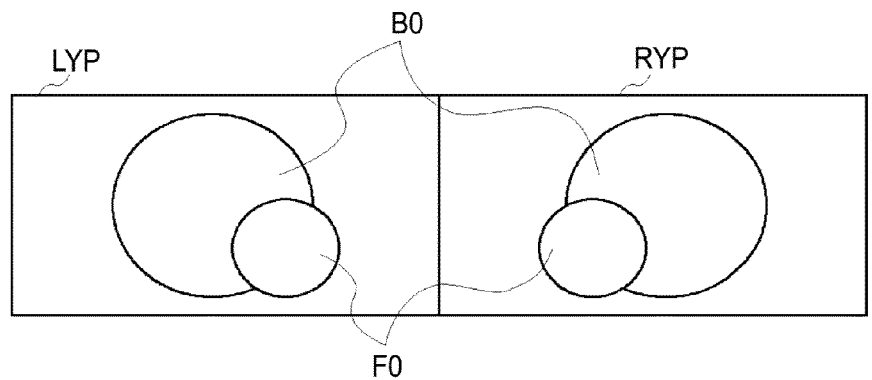

STEREOSCOPIC EFFECT BASED ON PARALLAX VECTOR

CASE WHERE DIFFERENCE OF PARALLAX VECTORS IS SMALL

CASE WHERE DIFFERENCE OF PARALLAX VECTORS IS LARGE

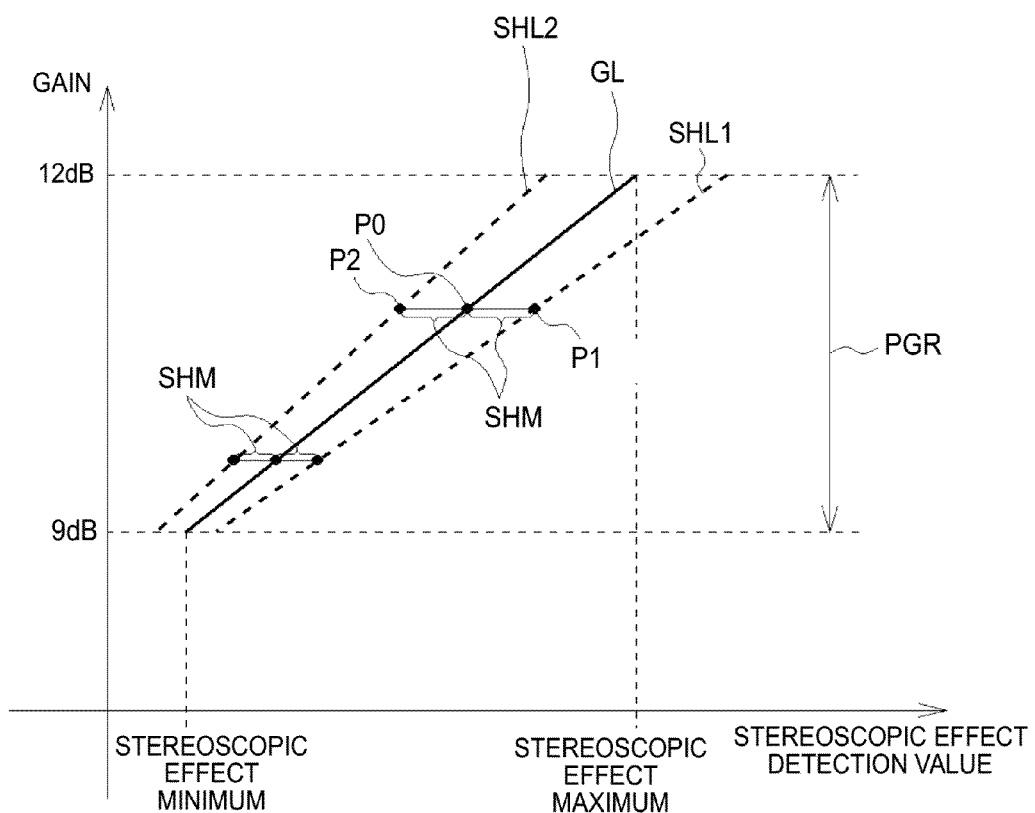

MONITOR DISPLAY IN SIMULTANEOUS DISPLAY MODE
ACCORDING TO FIRST EMBODIMENT

RELATION BETWEEN STEREOSCOPIC EFFECT DETECTION VALUE AND CONTOUR CORRECTION AMOUNT

MONITOR DISPLAY IN SIMULTANEOUS DISPLAY MODE
ACCORDING TO SECOND EMBODIMENT

CONTROL DEVICE, CONTROL METHOD AND CONTROL PROGRAM

FIELD

The present disclosure relates to a control device, a control method and a control program suitable for being applied to, for example, an imaging apparatus capable of switching between a single-eye imaging mode and a compound-eye imaging mode.

BACKGROUND

Recently, a display device for realizing stereoscopic vision of displayed images by displaying left-eye images and right-eye images to be seen by a viewer is becoming popular.

An imaging apparatus provided with plural imaging units for imaging an object by an imaging device is used in order to generate image data displaying the left-eye images and the right-eye images.

There exists an imaging apparatus performing correction processing to an image signal generated by imaging an object to thereby adjust brightness or resolution of an image to be displayed based on the image signal.

As one of the above imaging apparatuses, there is proposed an imaging apparatus in which individual difference of each imaging unit is corrected by taking a luminance level of an image signal obtained by one imaging unit as a reference and controlling the gain of the image signal obtained by another imaging unit to be amplified to the same luminance level as the reference level (for example, refer to JP-A-2010-154478 (Patent Document 1).

SUMMARY

In the above imaging apparatus, when noise included in the image signal outputted by the imaging unit is high, noise is amplified when correcting the image signal and may remain even after noise filtering processing is performed.

When the image taken by single-eye imaging is viewed in the display device, the viewer does not feel flicker due to the difference between the left-eye image and the right-eye image as the viewer sees the same noise with left and right eyes.

Here, a correction value used when performing correction processing to the image signal is a value obtained by balancing brightness as well as resolution of the image with noise in the single-eye imaging mode.

On the other hand, when images taken by compound-eye imaging are viewed in stereoscopic vision, the viewer sees noise remaining in right and left images respectively and varying at random with time lapse by right and left eyes separately.

Particularly in the above case, the difference is generated between right and left images seen by the viewer though the correction value optimized for the single-eye imaging mode is used, which makes the viewer to feel flicker or to see images as if noise has distribution in the depth direction, as a result, it is difficult for the viewer to feel stereoscopic effect of the images.

As described above, it may be difficult to generate image data with high quality regardless of the single-eye imaging mode and the compound-eye imaging mode.

In view of the above, it is desirable to provide a control device, a control method and a control program capable of generating image data with high-quality image data in an imaging apparatus capable of switching between a single-eye imaging mode and a compound-eye imaging mode.

An embodiment of the present disclosure is directed to a control device including a determination unit determining which mode is designated in a single-eye imaging mode in which imaging is performed by using a single imaging unit obtaining an image signal by imaging an object by an imaging device and a compound-eye imaging mode in which imaging is performed by using plural imaging units and a gain maximum value control unit changing a gain maximum value which is the maximum value of the gain of the image signal based on the determination result by the determination unit.

In the above control device, noise seen by a viewer at the time of viewing images in stereoscopic vision can be reduced by changing the amplification of the image signal so as not to exceed respective allowable noise levels in the single-eye imaging mode and the compound-eye imaging mode, therefore, high-quality image data in which image quality, brightness and perception of stereoscopic effect are well balanced can be generated.

Another embodiment of the present disclosure is directed to a control device including a determination unit determining which mode is designated in a single-eye imaging mode in which imaging is performed by using a single imaging unit obtaining an image signal by imaging an object by an imaging device and a compound-eye imaging mode in which imaging is performed by using plural imaging units and a contour correction amount control unit changing a contour correction amount for performing contour correction with respect to the image signal based on the determination result by the determination unit.

In the above control device, noise seen by the viewer at the time of viewing images in stereoscopic vision can be reduced by changing the degree of contour correction processing so as not to exceed respective allowable noise levels in the single-eye imaging mode and the compound-eye imaging mode, therefore, high-quality image data in which image quality, resolution and perception of stereoscopic effect are well balanced can be generated.

According to the embodiment of the present disclosure, noise seen by the viewer at the time of viewing images in stereoscopic vision can be reduced by changing the amplification of the image signal so as not to exceed respective allowable noise levels in the single-eye imaging mode and the compound-eye imaging mode, therefore, high-quality image data in which image quality, brightness and perception of stereoscopic effect are well balanced can be generated.

According to the embodiment of the present disclosure, noise seen by the viewer at the time of viewing images in stereoscopic vision can be reduced by changing the degree of contour correction processing so as not to exceed respective allowable noise levels in the single-eye imaging mode and the compound-eye imaging mode, therefore, high-quality image data in which image quality, resolution and perception of stereoscopic effect are well balanced can be generated.

Consequently, it is possible to realize the control device, the control method and the control program which can generate high-quality image data by using the imaging apparatus capable of switching between the single-eye imaging mode and the compound-eye imaging mode.

BRIEF DESCRIPTION OF THE DRAWINGS

FIGS. 6A and 6B are rough diagrams showing scenes where stereoscopic effect is small and where stereoscopic effect is large;

FIG. 8 is a rough diagram showing the relation between a stereoscopic effect detection value and a gain;

DETAILED DESCRIPTION

Hereinafter, the modes for carrying out the present disclosure (hereinafter referred to as embodiments) will be explained. The explanation will be made in the following order.

1. First Embodiment (an example in which a gain maximum value is changed in a single-eye imaging and a compound-eye imaging)

2. Second Embodiment (an example in which a contour correction amount is changed in the single-eye imaging and the compound-eye imaging 3. Other embodiments 1. First Embodiment

[1-1. Configuration of an Imaging Device]

Figure 1:
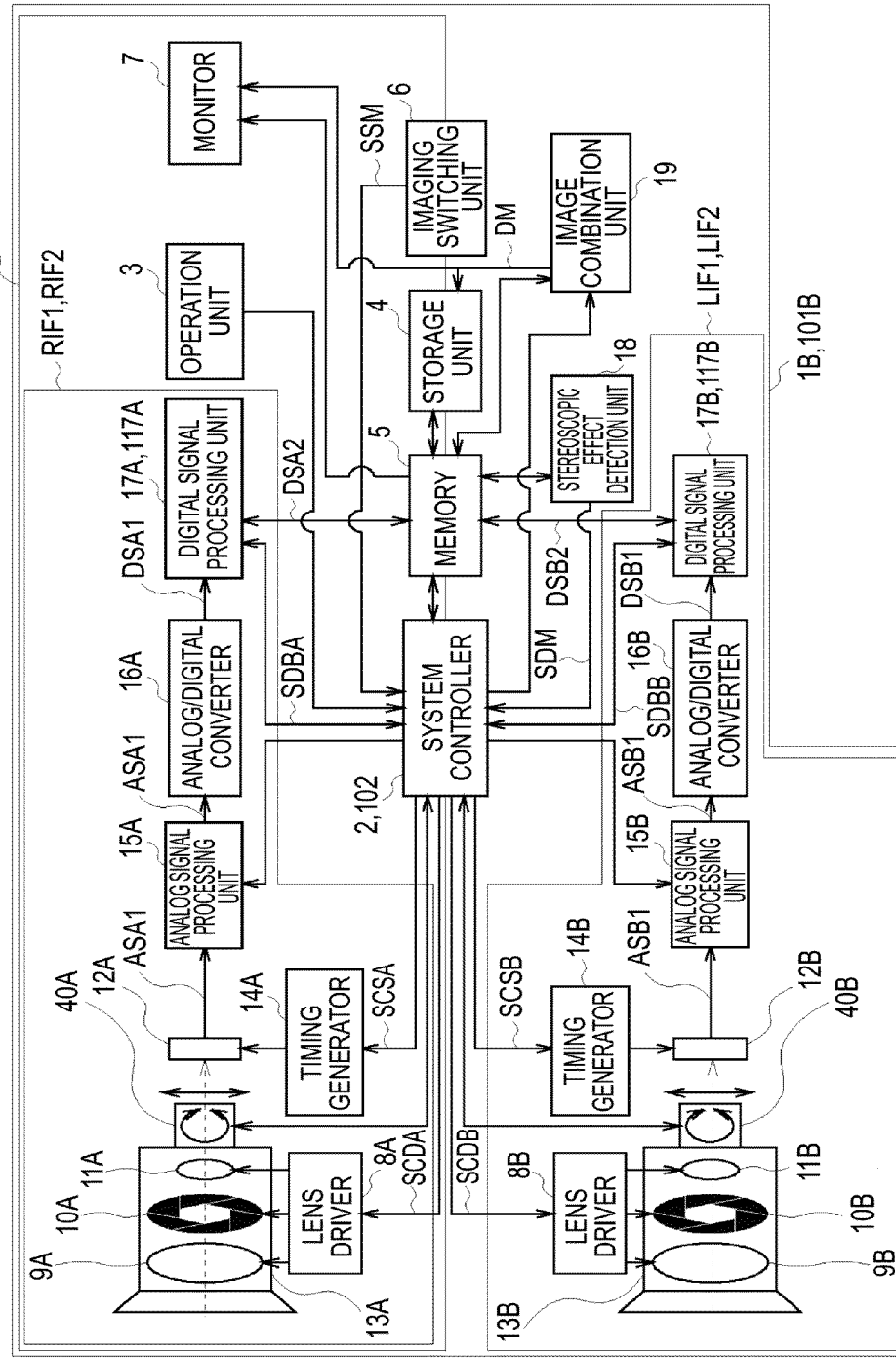
FIG. 1 is a rough diagram showing the entire configuration of an imaging apparatus according to first and second embodiments.

An imaging device 1 according to a first embodiment shown in FIG. 1 presents a user with images based on image data obtained by imaging an object as well as stores the image data.

The imaging apparatus 1 includes two imaging units which are a right-eye imaging unit RIF1 and a left-eye imaging unit LIF1 on which imaging devices for imaging objects are mounted.

The imaging apparatus 1 can perform single-eye imaging as well as compound-eye imaging. The imaging apparatus 1 operates a configuration of a single-eye imaging system 1A including the right-eye imaging unit RIF1 in a single-eye imaging mode for performing single-eye imaging. On the other hand, the imaging apparatus 1 operates a configuration of a compound-eye imaging system 1B including the right-eye imaging unit RIF1 and the left-eye imaging unit LIF1 in a compound-eye imaging mode for performing compound-eye imaging.

A system controller 2 includes a not-shown CPU (Central Processing Unit), totally controlling the imaging apparatus 1 by reading out various programs and so on stored in a storage unit 4 to a memory 5 and executing them in accordance with user's operation through a control unit 3.

An imaging switching unit 6 includes a physical switch, a touch panel or the like, which is configured to transmit an imaging switching signal SSM to the system controller 2 based on user's operation switching between the single-eye imaging mode and the compound-eye imaging mode.

The system controller 2 displays image data which is presently imaged on a monitor 7, thereby allowing the user to check an image in a scene being imaged.

[1-2. Configuration of a Single-Eye Imaging System]

When the single-eye imaging is designated by user's operation through the imaging switching unit 6, the imaging apparatus 1 moves a zoom lens 9A to an optical axis direction by a lens driver 8A under control by the system controller 2. Thus, the imaging apparatus 1 adjusts zoom magnification with respect to an object as an imaging target and allows object's light which is light from the object to be incident on an aperture 10A.

The aperture 10A is driven by the lens driver 8A to be controlled, thereby adjusting the light amount of the object's light to be incident on a focus lens 11A.

The focus lens 11A is driven by the lens driver 8A to move in the optical axis direction, thereby adjusting a focal position of collected object's light and irradiating the object's light to an imaging device 12A to form an optical image on an imaging surface of the imaging device 12A.

Incidentally, the zoom lens 9A, the aperture 10A and the focus lens 11A are installed inside a right-eye lens barrel 13A. An actuator 40A is attached to the right-eye lens barrel 13A, and the lens barrel 13A is driven by the actuator 40A.

The imaging device 12A adjusts the light amount of object's light to be received by changing shutter speed of an electronic shutter by a timing signal transmitted from a timing generator 14A under control by the system controller 2 and transmits the imaged result of the optical image formed on the imaging surface as an analog image signal ASA1.

As described above, the system controller 2 is configured to control the lens driver 8A to drive the aperture 10A and controls the timing generator 14A to drive the imaging device 12A to thereby adjust exposure at the time of imaging the object in the right-eye imaging unit RIF1.

An analog signal processing unit 15A performs correlated double sampling of the analog image signal ASA1 under control by the system controller 2 and transmits the signal to an analog/digital converter 16A.

The analog/digital converter 16A performs analog/digital conversion of the analog image signal ASA1 so as to be a digital image signal DSA1 and transmits the signal to a digital signal processing unit 17A.

Figure 2:
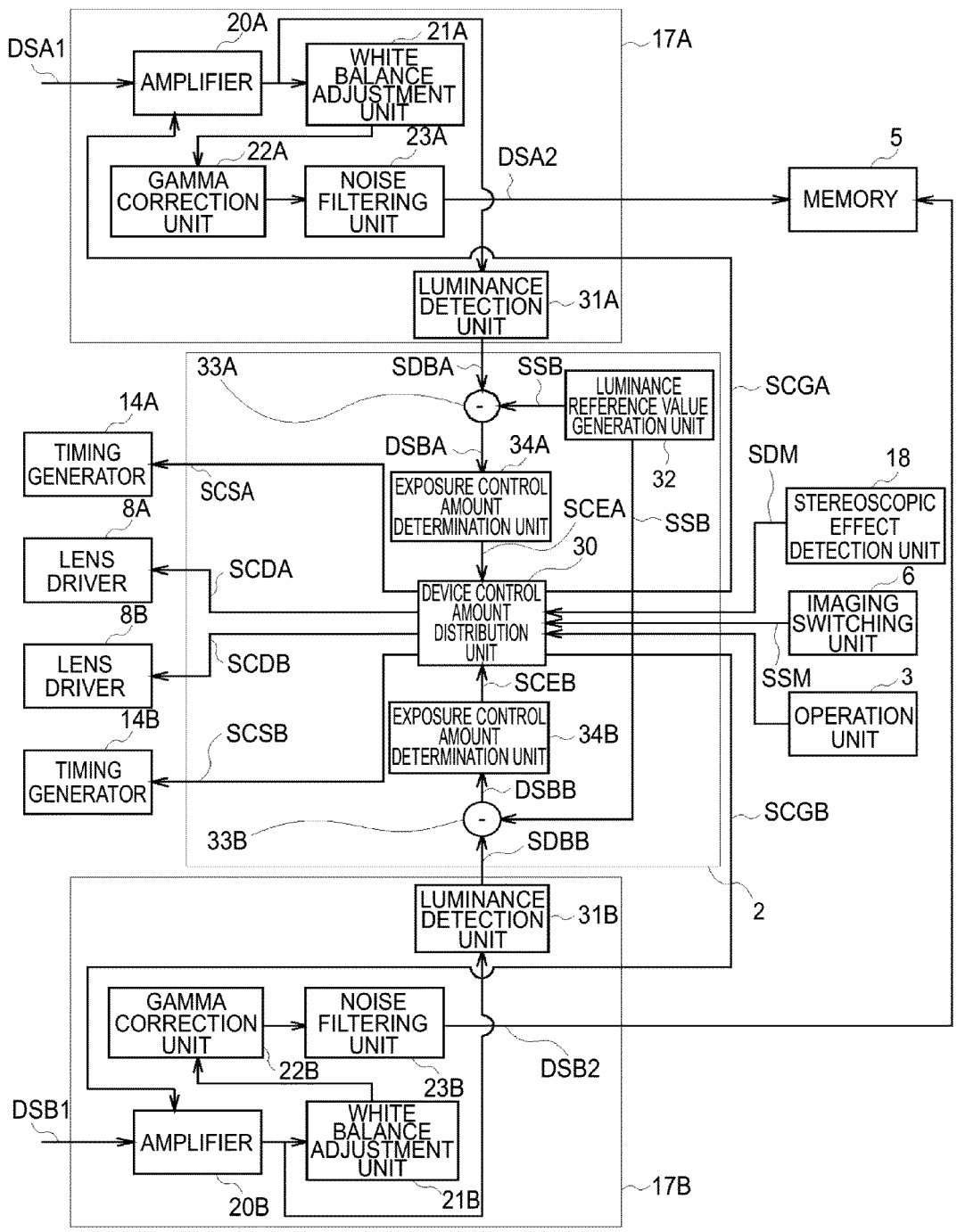
FIG. 2 is a rough diagram showing configuration of a digital signal processing unit and a system controller according to the first embodiment.

The digital signal processing unit 17A includes a DSP (Digital Signal Processor). The digital signal processing unit 17A amplifies the digital image signal DSA1 with a given gain in an amplifier 20A as shown in FIG. 2 under control by a device control amount distribution unit 30 (which will be described later in detail) in the system controller 2, transmitting the signal to a white balance adjustment unit 21A and a luminance detection unit 31A.

Subsequently, after the white balance adjustment unit 21A adjusts white balance of the digital image signal DSA1, a gamma correction unit 22A performs gamma correction and transmits the digital image signal DSA1 to a noise filtering unit 23A.

The noise filtering unit 23A performs frame addition, for example, in a time direction with respect to the digital image signal DSA1 to thereby reduce noise included in the digital image signal DSA1, transmitting the signal to the memory 5 as a right-eye image data DSA2.

The system controller 2 also reads out the right-eye image data DSA2 from the memory 5 and transmits the data to the monitor 7, thereby displaying the right-eye image on the monitor 7.

The system controller 2 further stores the right-eye image data DSA2 transmitted to the memory 5 in the storage unit 4 (FIG. 1) including, for example, an optical disc, a magnetic disc, a memory card, a hard disc or the like.

When performing control of exposure, the digital signal processing unit 17A (FIG. 2) detects a luminance detection value which is a luminance level of the right-eye image data DSA2 in the luminance detection unit 31A and transmits the value to the system controller 2 as a luminance detection signal SDBA.

A given luminance reference value is set in advance in a luminance reference value generation unit 32 in the system controller 2, and the luminance reference value generation unit 32 transmits a luminance reference signal SSB indicating the luminance reference value.

A luminance difference value calculation unit 33A calculates a luminance difference value between the luminance reference signal SSB transmitted from the luminance reference value generation unit 32 and the luminance detection signal SDBA acquired from the luminance detection unit 31A, transmitting a luminance difference signal DSBA indicating the luminance difference value to an exposure control amount determination unit 34A.

The exposure control amount determination unit 34A determines an exposure control amount (EV value) based on the luminance difference value indicated by the luminance difference signal DSBA and transmits an exposure control signal SCEA indicating the exposure control amount to the device control amount distribution unit 30.

Actually, the exposure control amount determination unit 34A is configured to perform control so that the luminance level of the right-eye image data DSA2 is increased by reducing the exposure control amount when the luminance detection value is lower than the luminance reference value, namely, the right-eye image data DSA2 is darker than the reference.

On the other hand, the exposure control amount determination unit 34A is configured to perform control so that the luminance level of the right-eye image data DSA2 is reduced by increasing the exposure control amount when the luminance detection value exceeds the luminance reference value, namely, the right-eye image data DSA2 is brighter than the reference.

The device control amount distribution unit 30 calculates an aperture control amount for controlling the lens driver 8A, a shutter speed control amount for controlling the timing generator 14A and a gain control amount for controlling the amplifier 20A based on the exposure control amount indicated by the exposure control signal SCEA.

Actually, the device control amount distribution unit increases the aperture control amount (F-number) and transmits an aperture control signal SCDA indicating the aperture control amount to the lens driver 8A when the acquired exposure control signal SCEA indicates the increase of the exposure control amount (that is, the luminance level of the right-eye image data DSA2 is reduced).

The lens driver 8A (FIG. 1) acquires the aperture control signal SCDA and drives the aperture 10A so as to be narrowed down to reduce the light amount of the object's light when the aperture control amount indicated by the aperture control signal SCDA indicates the increase of an aperture value.

The device control amount distribution unit 30 (FIG. 2) increases a shutter-speed control amount and transmits a shutter-speed control signal SCSA indicating the shutter-speed control amount to the timing generator 14A when the acquired exposure control signal SCEA indicates the increase of the exposure control amount.

The timing generator 14A (FIG. 1) acquires the shutter-speed control signal SCSA and drives the imaging device 12A to speed up the shutter speed to thereby reduce the light amount of the object's light when the shutter-speed control amount indicated by the shutter-speed control signal SCSA indicates the speed-up of shutter speed.

The device control amount distribution unit 30 (FIG. 2) further reduces the gain control amount and the transmits a gain control signal SCGA indicating the gain control amount to the amplifier 20A when the acquired exposure control signal SCEA indicates the increase of the exposure control amount.

The amplifier 20A acquires the gain control signal SCGA and reduces the gain used for amplifying the digital image signal DSA1 when the gain control amount indicated by the gain control signal SCGA indicates the reduction of the gain. As a consequence, the amplifier 20A reduces the luminance level of the right-eye image data DSA 2.

Incidentally, the system controller 2 is also configured to control the aperture control amount, the shutter-speed control amount and the gain control amount by the device control amount distribution unit 30 in accordance with user's operation through the operation unit 3.

Here, the device control amount distribution unit 30 is configured to change the gain control amount in accordance with either of the compound-eye imaging mode and the single-eye imaging mode indicated by the imaging switching signal SSM when acquiring the imaging switching signal SSM from the imaging switching unit 6 (which will be described later).

Additionally, when acquiring a stereoscopic effect detection signal SDM indicating a stereoscopic effect of a scene presently imaged from a stereoscopic effect detection unit 18, the device control amount distribution unit 30 is also configured to change the gain control amount based on the stereoscopic effect detection signal SDM (which is described later).

As described above, the imaging apparatus 1 is configured to store the right-eye image data DSA2 acquired by imaging the object by using the right-eye imaging unit RIF1 in the storage unit 4 as well as displays the right-eye image based on the right-eye image data DSA2 on the monitor 7 in the single-eye imaging mode.

[1-3. Configuration of a Compound-Eye Imaging System]

On the other hand, when the compound-eye imaging is designated by user's operation through the imaging switching unit 6, the imaging apparatus 1 allows the compound-eye imaging system 1B to function.

The imaging apparatus 1 generates a left-eye image data DSB2 in addition to the right-eye image data DSA2 by operating the left-eye imaging unit LIF1 in addition to the above right-eye imaging unit RIF1 in the compound-eye imaging mode. The left-eye imaging unit LIF1 has approximately the same configuration as the right-eye imaging unit RIF1.

The object's light is irradiated on an imaging device 12B through a zoom lens 9B, an aperture 10B and a focus lens 11B installed in a left-eye lens barrel 13B and driven by a lens driver 8B.

An actuator 40B is attached to the left-eye lens barrel 13B, and the lens barrel 13B is driven by the actuator 40B.

Figure 3A:
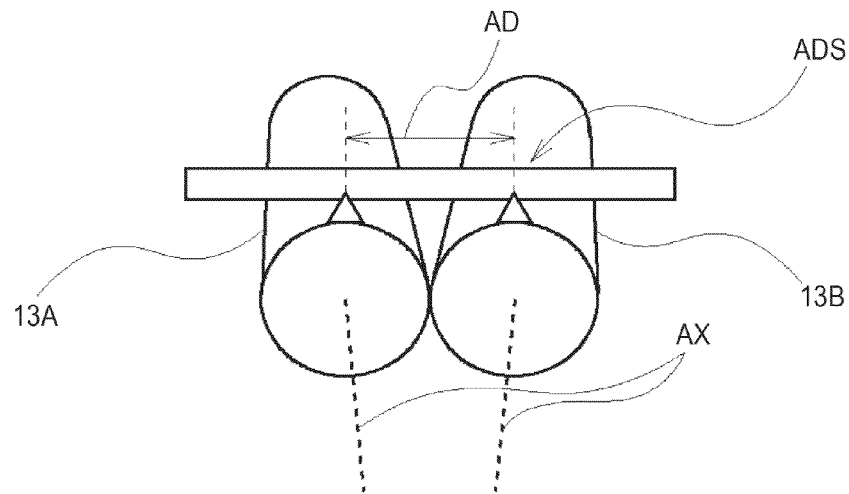
FIGS. 3A and 3B are rough diagrams showing variation of an optical-axis interval.
Figure 3B:
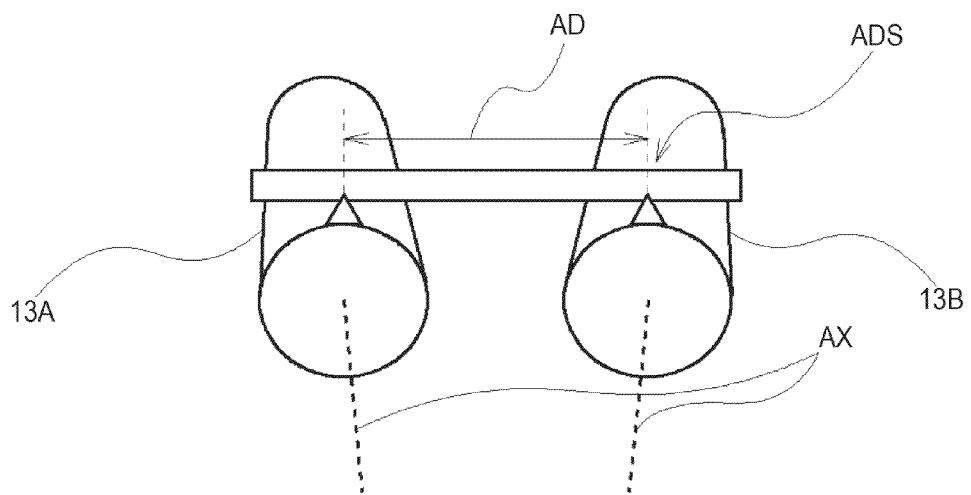

The system controller 2 controls the actuator 40B as well as the above-described actuator 40A to move the right-eye lens barrel 13A and the left-eye lens barrel 13B in directions apart from and close to each other as in a state where the imaging apparatus 1 is seen from the object's side as shown in FIGS. 3A and 3B.

Thus, the system controller 2 changes an optical axis interval AD which is an interval between an optical axis AX of the object's light in the right-eye lens barrel 13A and an optical axis AX of the object's light in the left-eye lens barrel 13B.

Figure 13:
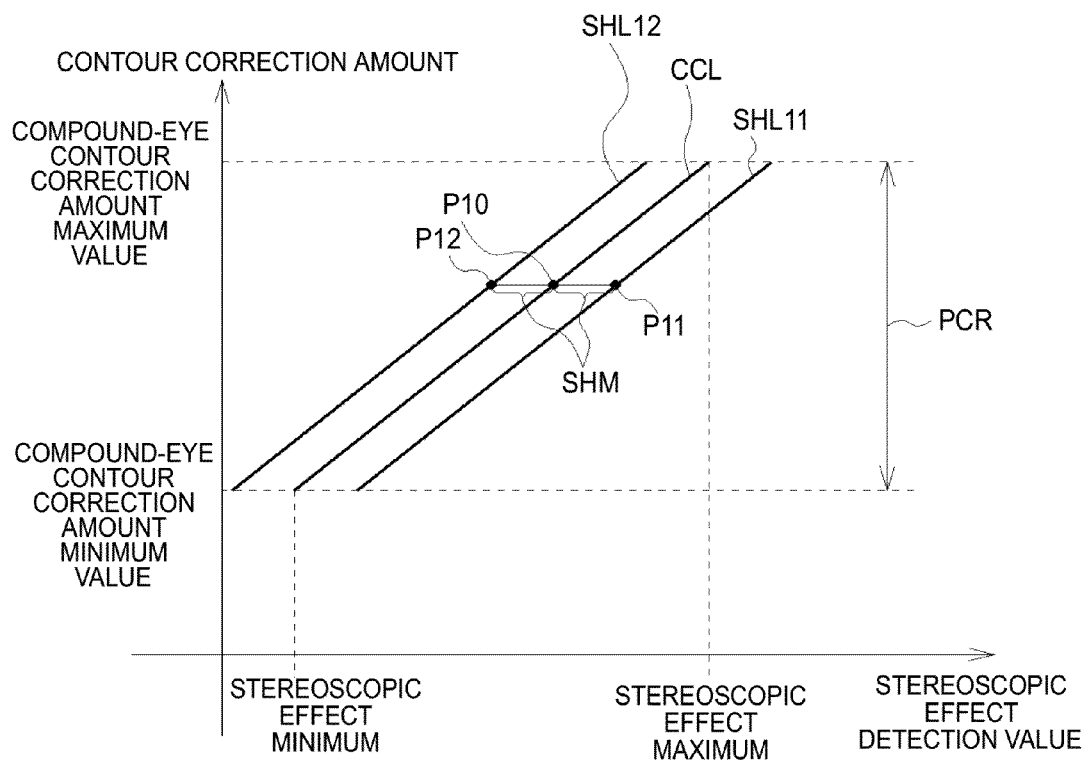
FIG. 13 is a rough diagram showing the relation between a stereoscopic effect detection value and a contour correction amount.

The optical axis interval AD is narrow as the right-eye lens barrel 13A and the left-eye lens barrel 13B are close to each other in FIG. 3A, whereas, the optical axis interval AD is wide as the right-eye lens barrel 13A and the left-eye lens barrel 13B are apart from each other in FIG. 13B.

Thus, the system controller 2 can adjust stereoscopic effect in the image obtained by imaging a scene in which the object is caught in the compound-eye imaging mode (which will be described later).

Figure 4A:
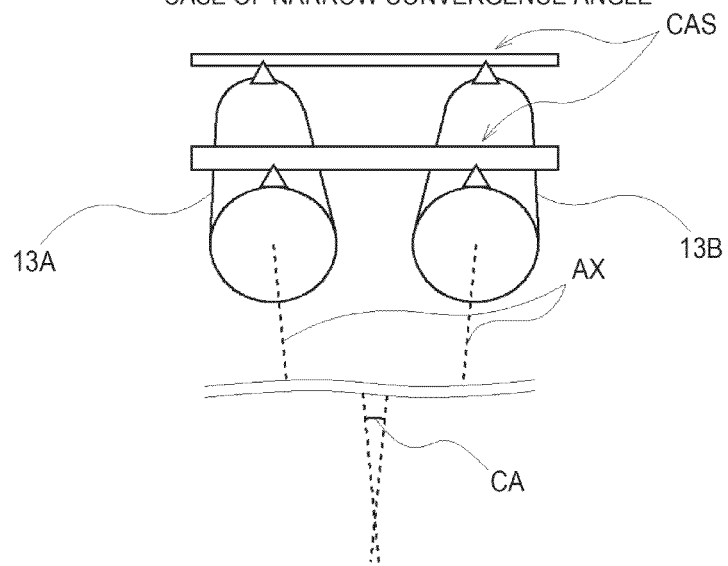
FIGS. 4A and 4B are rough diagrams showing variation of a convergence angle.
Figure 4B:
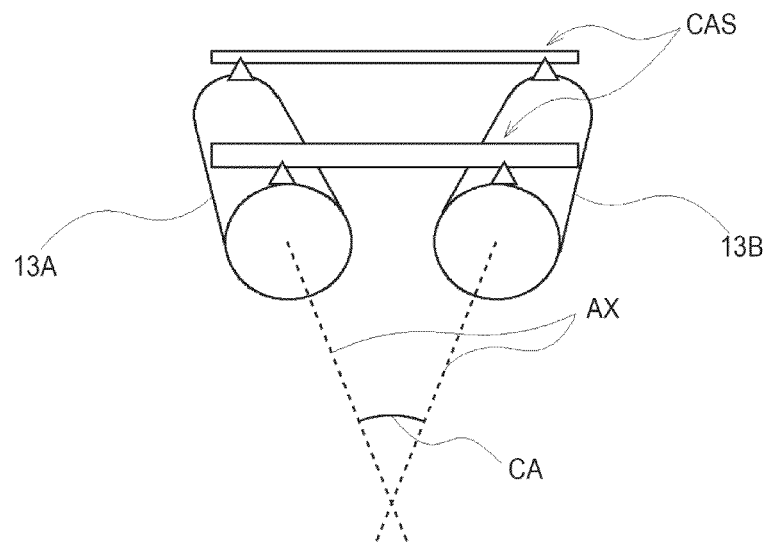

The system controller 2 also controls the actuator 40A and the actuator 40B to turn the right-eye lens barrel 13A and the left-eye lens barrel 13B so that end portions of the right-eye lens barrel 13A and the left-eye lens barrel 13B are apart from and close to each other as in a state where the imaging apparatus 1 is seen from the object's side as shown in FIGS. 4A and 4B.

Thus, the system controller 2 changes a convergence angle CA which is an angle made by the optical axis AX of the object's light in the right-eye lens barrel 13A and the optical axis AX of the object's light in the left-eye lens barrel 13B.

In FIG. 4A, the end portions of the right-eye lens barrel 13A and the left-eye lens barrel 13B on the object's side are turned toward the inside in a small degree, therefore, the convergence angle CA is narrow. On the other hand, the end portions of the right-eye lens barrel 13A and the left-eye lens barrel 13B are turned toward the inside in a large degree, therefore, the convergence angle CA is wide.

Thus, the imaging apparatus 1 can adjust the stereoscopic effect (which will be described later) in the image in the compound-eye imaging mode.

The imaging device 12B (FIG. 1) adjusts the light amount of object's light by changing shutter speed of the electronic shutter by a timing signal transmitted from a timing generator 14B and transmits the imaged result of the optical image formed on the imaging surface as an analog image signal ASB1.

As described above, the system controller 2 controls the lens driver 8B to drive the aperture 10B and controls the timing generator 14B to drive the imaging device 12B to thereby adjust exposure at the time of imaging the object in the left-eye imaging unit LIF1.

Subsequently, the system controller 2 transmits the left-eye image data DSB2 to the memory 5 through an analog signal processing unit 15B, an analog/digital converter 16B and a digital signal processing unit 17B in the same manner as the right-eye imaging unit RIF1.

The right-eye image data DSA2 acquired by the right-eye imaging unit RIF1 is stored in the memory 5 in addition to the left-eye image data DSB2 in the compound-eye imaging mode.

When the right-eye image data DSA2 and the left-eye image data DSB2 are stored in the memory 5 in the compound-eye imaging mode as in the above case, the system controller 2 reads out the right-eye image data DSA2 and the left-eye image data DSB2 from the memory 5 and combines these data in an image combination unit 19 to generate a combined image data DM, then, transmits the data to the storage unit 4.

The system controller 2 displays the combined image data DM generated in the image combination unit 19 on the memory 7 in the composed-eye imaging mode, thereby allowing the user to check video in a state where the scene presently being imaged is stored in the storage unit 4.

Here, when exposure control is performed, a luminance difference value calculation unit 33B in the system controller (FIG. 2) calculates a luminance difference value between the luminance reference signal SSB transmitted from the luminance reference value generation unit 32 and a luminance detection signal SDBB acquired from a luminance detection unit 31B as in the single-eye imaging mode. Subsequently, the luminance difference value calculation unit 33B transmits a luminance difference signal DSBB indicating the luminance difference value to an exposure control amount determination unit 34B.

The exposure control amount determination unit 34B determines an exposure control amount (EV value) based on the luminance difference value indicated by the luminance difference signal DSBB and transmits an exposure control signal SCEB indicating the exposure control amount to the device control amount distribution unit 30.

The device control amount distribution unit 30 calculates an aperture control amount for controlling the lens driver 8B, a shutter speed control amount for controlling the timing generator 14B and a gain control amount for controlling the amplifier 20B based on the exposure control amount indicated by the exposure control signal SCEB in the same manner as the lens driver 8A, the timing generator 14A and the amplifier 21A.

The device control amount distribution unit 30 performs the same processing as in the case of the single-eye imaging mode, thereby controlling the aperture 10B, the imaging device 12B and the amplifier 20B to change the light amount of object's light as well as to change the brightness of the left-eye image data DSB2.

[1-4. Operation in the Single-Eye Imaging Mode]

As described above, the system controller 2 is configured to change the gain control amount for controlling the amplifiers 20A and 20B in accordance with the single-eye imaging or the compound-eye imaging designated by the imaging switching unit 6.

Figure 5:
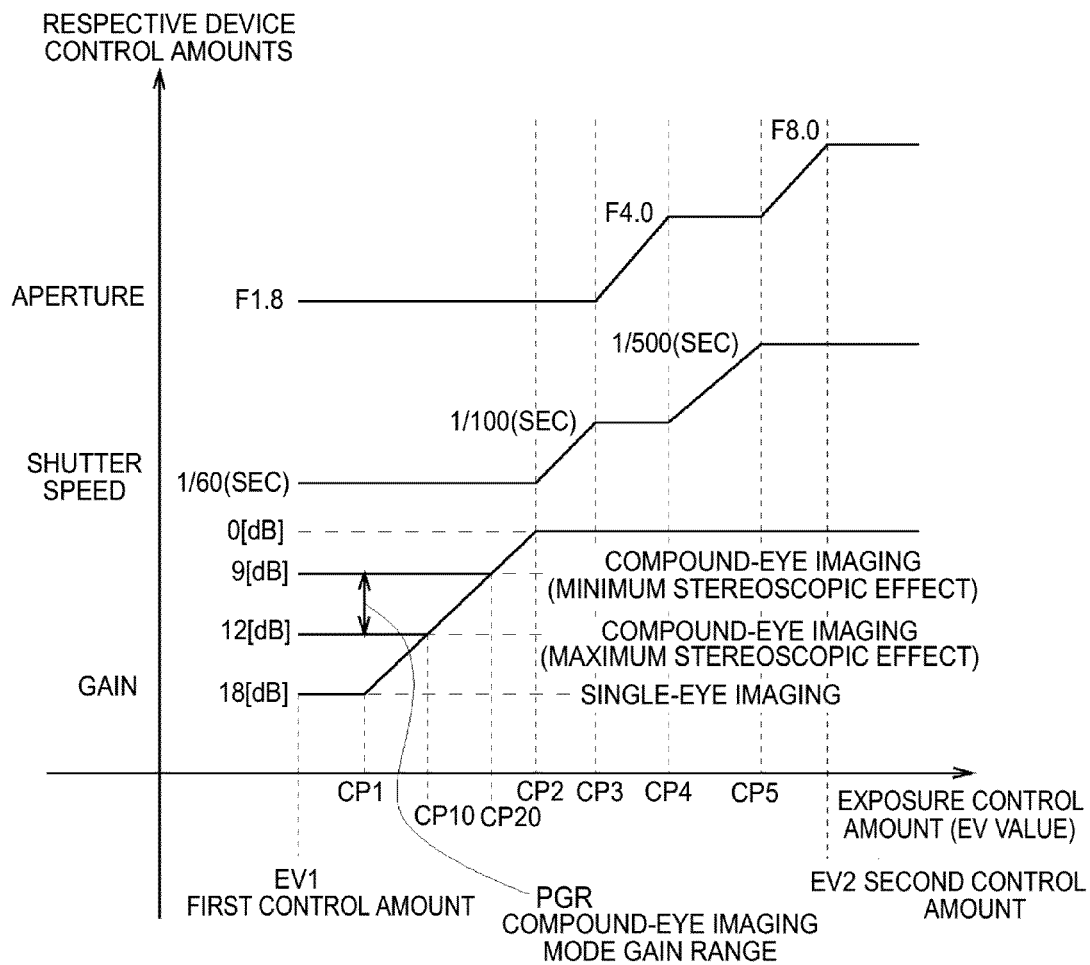
FIG. 5 shows program diagrams indicating relations between an exposure control amount and an electronic shutter control amount, an aperture control amount as well as a gain control amount.

When the single-eye imaging is designated by the imaging switching unit 6, the system controller 2 changes the aperture, the shutter speed and the gain with respect to variation of the exposure control amount as shown by program diagrams of FIG. 5. Note that not only variation of the gain in the single-eye imaging mode but also variation of the gain in the compound-eye imaging mode is shown together in FIG. 5.

A case where the luminance level of the right-eye image data DSA2 is controlled to be reduced as the exposure control amount is changed from a first control amount EV1 to a second control amount EV2, namely, as the imaging is shifted from imaging of a dark scene (dark place imaging) to imaging of a bright scene (bright place imaging) will be explained below. In the first control amount EV1, the gain is 18(dB), the shutter speed is 1/60 (sec) and the aperture is F1.8.

As the exposure control amount is increased from the first control amount EV1, first, the gain is gradually reduced from 18 (dB) to 0 (dB) in a range from a change point CP1 toward a change point CP2. Note that the gain is reduced along the vertical axis in the upward direction in FIG. 5.

Subsequently, when the exposure control amount is further increased from the change point CP2, the gain has already been 0 (dB), therefore, the shutter speed is gradually changed from 1/60 (sec) to 1/100 (sec) toward a change point CP3, as a result, the shutter speed is increased.

After that, the aperture is gradually changed from F1.8 to F4.0 in a range from the change point CP3 to a change point CP4, therefore, the aperture is gradually narrowed.

In a range from the change point CP4 to a change point CP5, the shutter speed is gradually changed from 1/100 (sec) to 1/500 (sec), therefore, the shutter speed is further increased.

In a range from the change point CP5 to the second control amount EV2, the aperture is gradually changed from F4.0 to F8.0, therefore, the aperture is further narrowed.

As described above, the system controller 2 sets the gain to 18 (dB) in the single-eye imaging mode in the case where dark place imaging is performed and the exposure control amount is the minimum (namely, the first control amount EV1). The system controller 2 is configured to reduce the luminance level of the right-eye image data DSA2 to darken the image by setting the gain of 18(dB) as the maximum value (also referred to as the gain maximum value) and reducing the gain as the exposure control amount is increased after that.

[1-5. Operation in the Compound-Eye Imaging Mode]

On the other hand, when the compound-eye imaging is designated by the imaging switching unit 6, the system controller 2 is configured to change the gain control amount in accordance with a program diagram which is different from the case of the single-eye imaging.

The system controller 2 is also configured to change the gain control amount in accordance with a different program diagram also in accordance with the stereoscopic effect in the scene which is presently imaged. Accordingly, a method of detecting the stereoscopic effect will be explained first as follows.

[1-5-1. Detection of Stereoscopic Effect]

As shown in FIG. 6A, a back-side object BO positioned on the back side with respect to the imaging apparatus 1 and a front-side object FO positioned on the front side are close to each other in the case of a scene with small stereoscopic effect. The scene with small stereoscopic effect indicates a scene with small depth difference between the back-side object BO and the front-side object FO.

In this case, displacement between the back-side object BO and the front-side object FO is small in a right-eye image RYP shown by the right-eye image data DSA2 and a left-eye image LYP shown by the left-eye image data DSB2.

On the other hand, in the case of a scene with large stereoscopic effect, the back-side object BO and the front-side object FO are apart from each other as shown in FIG. 6B as compared with the case of the case with small stereoscopic effect. That is, the scene with large stereoscopic effect indicates a scene with large depth difference between the back-side object BO and the front-side object FO.

In this case, displacement between the back-side object BO and the front-side object FO is large in the right-eye image RYP and the left-eye image LYP as compared with the scene with small stereoscopic effect.

The stereoscopic effect detection unit 18 (FIG. 1) reads out the right-eye image data DSA2 and the left-eye image data DSB2 from the memory 5 and detects the stereoscopic effect of the present scene.

Figure 7A:
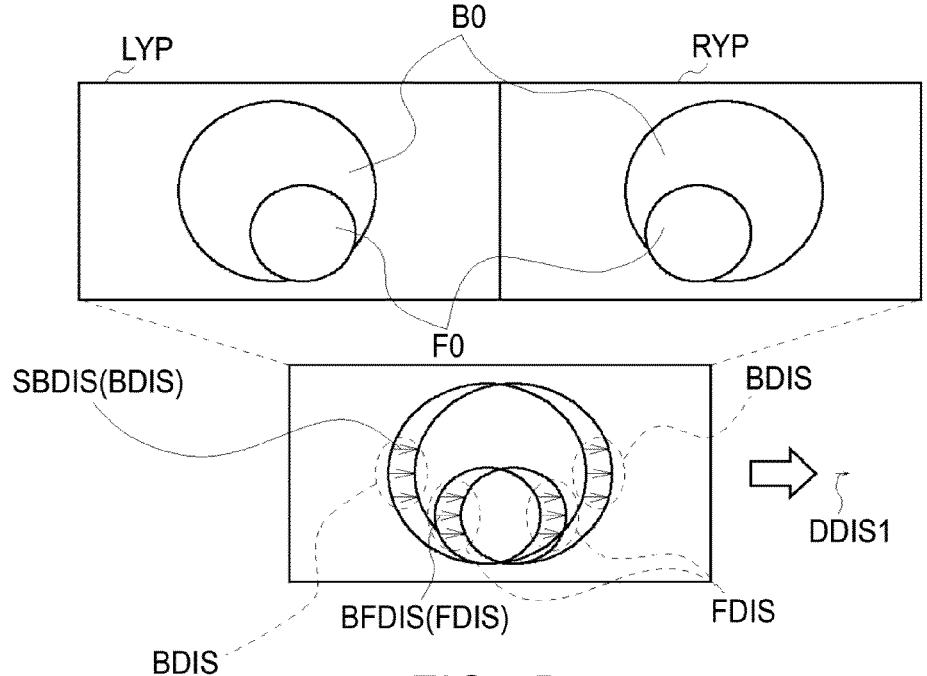
FIGS. 7A and 7B are rough diagrams showing stereoscopic effect based on parallax vectors.

Specifically, the stereoscopic effect detection unit 18 performs matching between the right-eye image RYP and the left-eye image LYP in each fixed block such as 8 pixel wide by 8 pixel high. Thus, the stereoscopic effect detection unit 18 detects plural back-side parallax vectors BDIS indicating parallax between the back-side object BO in the right-eye image RYP and the back-side object BO in the left-eye image LYP as shown in FIG. 7A.

Subsequently, the stereoscopic effect detection unit 18 selects a parallax vector having the minimum vector amount in the detected plural back-side parallax vectors BDIS as a back-side minimum parallax vector SBDIS.

The stereoscopic effect detection unit 18 further detects plural front-side parallax vectors FDIS indicating parallax between the front-side object FO in the right-eye image RYP and the front-side object FO in the left-eye image LYP.

Subsequently, the stereoscopic effect detection unit 18 selects a parallax vector having the maximum vector amount in the detected plural front-side parallax vectors FDIS as a front-side maximum parallax vector BFDIS.

After that, the stereoscopic effect detection unit 18 calculates a difference vector DDIS1 by taking a difference between the back-side minimum parallax vector SBDIS and the front-side maximum parallax vector BFDIS.

Figure 7B:
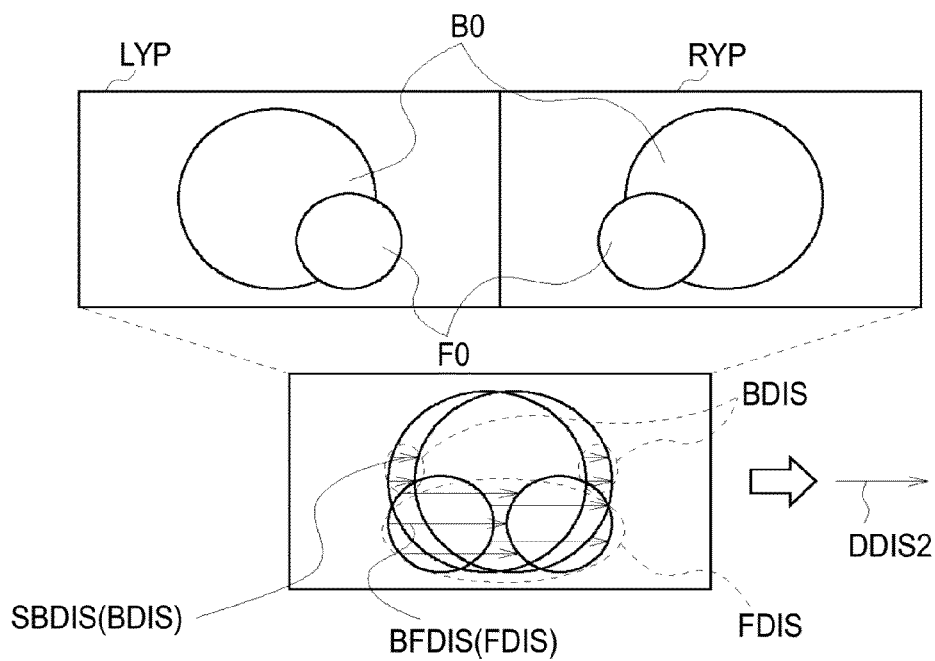

In the case of a scene with large stereoscopic effect as shown in FIG. 7B, a difference vector DDIS2 calculated in the same manner as the above is larger than the difference vector DDIS1 in the scene with small stereoscopic effect in FIG. 7A.

As described above, the stereoscopic effect detection unit 18 detects the small difference vector DDIS1 in the case of the scene with small stereoscopic effect as the difference between the back-side minimum parallax vector SBDIS and the front-side maximum parallax vector BFDIS is small.

On the other hand, the stereoscopic effect detection unit 18 detects the large difference vector DDIS2 which is larger than the vector in the scene with small stereoscopic effect in the case of the scene with large stereoscopic effect as the difference between the back-side minimum parallax vector SBDIS and the front-side maximum parallax vector BFDIS is large.

As described above, the stereoscopic effect detection unit 18 detects the size of the difference vector as the size of stereoscopic effect. The stereoscopic effect detection unit 18 determines an absolute value of the difference vector calculated as the above as a stereoscopic-effect detection value indicating stereoscopic effect of the scene, transmitting the stereoscopic-effect detection value to the device control amount distribution unit 30 in the system controller 2 (FIG. 2) as the stereoscopic-effect detection value SDM.

[1-5-2. Program Diagram in the Case of Large Stereoscopic Effect]

The system controller 2 changes the aperture, the shutter speed and the gain in accordance with variation of the exposure control amount as shown in the program diagrams shown in FIG. 5 in the case where the compound-eye imaging is designated by the imaging switching unit 6 and it is detected that the stereoscopic effect is large by the stereoscopic effect detection unit 18.

A case where the luminance level of the right-eye image data DSA2 and the left-eye image data DSB2 is controlled to be reduced as the exposure control amount is changed from the first control amount EV1 to the second control amount EV2, namely, as the imaging is shifted from the dark place imaging to the bright place imaging in the same manner as the above single-eye imaging mode will be explained below.

The following explanation will be made on the assumption that the stereoscopic effect detection value has reached the given maximum value and the stereoscopic effect is in the maximum state. In the first control amount EV1, the gain is 12 (dB), the shutter speed is 1/60 (sec) and the aperture is F1.8.

As the exposure control amount is increased from the first control amount EV1, first, the gain is gradually reduced from 12 (dB) to 0 (dB) in a range from a change point CP10 toward the change point CP2. The program diagram is the same as the above single-eye imaging mode in the sequential range, which is from the change point CP2 to the second control amount EV2, therefore, the explanation is omitted.

As described above, when the stereoscopic effect is the maximum in the compound-eye imaging mode, the system controller 2 sets the gain (12 (dB)) in the state where the exposure control amount is small as the gain maximum value and reduces the gain as the exposure control value is increased after that.

Accordingly, the gain maximum value (12 (dB)) in the case that stereoscopic effect is the maximum in the compound-eye imaging mode is lower than the gain maximum value (18 (dB)) in the single-eye imaging state.

[1-5-3. Program Diagram in the Case of Small Stereoscopic Effect]

The system controller 2 changes the aperture, the shutter speed and the gain in accordance with variation of the exposure control amount as shown in the program diagrams shown in FIG. 5 in the case where the compound-eye imaging is designated by the imaging switching unit 6 and it is detected that the stereoscopic effect is small by the stereoscopic effect detection unit 18.

The following explanation will be made on the assumption that the stereoscopic effect detection value has reached the given minimum value and the stereoscopic effect is in the minimum state. In the first control amount EV1, the gain is 9(dB), the shutter speed is 1/60 (sec) and the aperture is F1.8.

As the exposure control amount is increased from the first control amount EV1, first, the gain is gradually reduced from 9 (dB) to 0 (dB) in a range from a change point CP20 toward the change point CP2. The program diagram is the same as the above single-eye imaging mode in the sequential range, which is from the change point CP2 to the second control amount EV2, therefore, the explanation is omitted.

As described above, when the stereoscopic effect is the minimum in the compound-eye imaging mode, the system controller 2 sets the gain (9 (dB)) in the state where the exposure control amount is small as the gain maximum value and reduces the gain as the exposure control value is increased after that.

Accordingly, the gain maximum value (9 (dB)) in the case that stereoscopic effect is the minimum in the compound-eye imaging mode is lower than the gain maximum value (18 (dB)) in the single-eye imaging state.

The case where the stereoscopic effect is the minimum and the case where the stereoscopic effect is the maximum in the compound-eye mode have been explained as the above. On the other hand, when the stereoscopic effect is between the minimum and the maximum, the system controller 2 sets the gain maximum value to, for example, 10 (dB), which is within a range of a compound-eye imaging mode gain range PGR (FIG. 5) which is between 9 (dB) and 12 (dB).

In the compound-eye imaging mode, the gain maximum values are 9 (dB) and 12 (dB), which are lower than 18 (dB) which is the gain maximum value in the single-eye imaging mode in both cases where the stereoscopic effect is the minimum or where the stereoscopic effect is the maximum.

As described above, the noise filtering units 23A and 23B in the digital signal processing units 17A and 17B (FIG. 2) perform noise filtering processing to the digital image signals DSA1 and DSA2. Accordingly, the noise filtering units 23A and 23B reduce noise included in the right-eye image data DSA2 and the left-eye image data DSB2 stored in the storage unit 4.

However, it may be difficult that the noise filtering units 23A and 23B completely remove noise even when the above noise filtering is performed. Accordingly, noise may remain in the right-eye image data DSA2 and the left-eye image data DSB2.

Particularly, at the time of the dark place imaging, brightness of image display is maintained by amplifying the digital image signals DSA1 and DSB1 in a large scale, therefore, noise included in the digital image signals DSA1 and DSB1 is also amplified.

Therefore, it is sometimes difficult that the noise filtering units 23A and 23B remove the amplified noise completely. Therefore, residual noise may occur in the right-eye image data DSA2 and the left-eye image data DSB2.

Here, when the viewer sees the right-eye image data DSA2 stored by performing the signal-eye imaging by a given display device, the viewer recognizes the same noise by right and left eyes because only the image based on the right-eye image data DSA2 is displayed on the display device if noise is included in the right-eye image data DSA2.

Therefore, when the right-eye image data DSA2 stored by performing the single-eye imaging is seen, the viewer does not feel flicker due to the difference between images in the left-eye image data DSB2 and the right-eye image data DSA2 as the viewer does not see the left-eye image data DSB2.

On the other hand, when the combined image data DM stored by performing the compound-eye imaging is seen in stereoscopic vision by the viewer in the given display device, the viewer separately sees noise by right and left eyes, which remains in right and left images respectively and vary at random with time lapse respectively if noise is included in the combined image data DM.

Therefore, the difference is generated between the left-eye image data DSB2 and the right-eye image data DSA2 included in the combined image data DM, as a result, the viewer feels flicker of the screen when seeing images or sees noise with distribution in the depth direction.

Therefore, when the gain maximum value (18 (dB)) in the signal-eye imaging mode is directly applied to the compound-eye imaging mode, large-scale flicker occurs when the viewer sees the combined image data DM due to residual noise included in the digital image signals SDA1 and SDB1. That is, the allowable residual noise amount in the compound-eye imaging mode is smaller than the amount in the single-eye imaging mode.

Accordingly, the imaging apparatus 1 is configured to reduce the gain maximum value in the compound-eye imaging mode to be lower than the gain maximum value in the single-eye imaging mode.

Thus, the imaging apparatus 1 amplifies the digital image signals DSA1 and DSB1 to the gain maximum value in the compound-eye imaging mode to a degree not exceeding the allowable noise level of the compound-eye imaging mode which is lower than the single-eye imaging mode, thereby brightening the image as well as generating image data in which noise is reduced and stereoscopic effect can be felt.

As shown in FIG. 5, the gain maximum value (12 (dB)) used when stereoscopic effect is maximum is higher than the gain maximum value (9 (dB)) used when the stereoscopic effect is minimum in the compound-eye imaging mode.

Here, when stereoscopic effect of the scene being imaged is large, the viewer can see the scene in a state of not being directly affected by noise having distribution in the depth direction without impairing stereoscopic effect even when some residual noise is included in the combined image data DM.

On the other hand, when stereoscopic effect of the scene being imaged is small, it is difficult for the viewer to feel stereoscopic effect when residual noise is included in the combined image data DM because the viewer sees the image as if the stereoscopic effect of the image is buried in noise having distribution in the depth direction.

That is, the allowable residual noise amount in the case of small stereoscopic effect is smaller than the case of large stereoscopic effect.

Therefore, the imaging apparatus 1 is configured to reduce the gain maximum value (9 (dB)) used when stereoscopic effect is the minimum to be lower than the gain maximum value (12 (dB)) used when stereoscopic effect is the maximum in the compound-eye imaging mode.

Accordingly, the imaging apparatus 1 amplifies the digital image signals DSA1 and DSB1 to the gain maximum value used when stereoscopic effect is small to a degree not exceeding the allowable noise level used when stereoscopic effect is small which is lower than the case of large stereoscopic effect, thereby brightening the image as well as generating image data in which noise is reduced and stereoscopic effect can be felt.

[1-5-4. Variation of the Gain with Respect to Variation of Stereoscopic Effect]

As described above, the system controller 2 changes the gain maximum value within a range of the compound-eye imaging mode gain range PGR (FIG. 5) which is between 9 (dB) and 12 (dB) in accordance with the stereoscopic effect in the compound-eye imaging mode.

Variation of the gain with respect to variation of the stereoscopic effect detection value in the compound-eye imaging mode will be explained below. As shown by the relation between the stereoscopic effect detection value and the gain shown in FIG. 8, the gain is gradually increased along a gain line GL from 9 (dB) used when the stereoscopic effect is the minimum to 12 (dB) used when the stereoscopic effect is the maximum.

Here, for example, when the stereoscopic effect detection value is increased in a state where the present gain is at a point "P0", the device control amount distribution unit 30 does not increase the gain until the stereoscopic effect detection value reaches a point "P1" and increases the gain along a threshold line SHL1 when reaching the point "P1".

Similarly, when the stereoscopic effect detection value is reduced in state where the gain is at the point "P0", the device control amount distribution unit 30 does not reduce the gain until the stereoscopic effect detection value reaches a point "P2" and reduces the gain along a threshold line SHL2 when reaching the point "P2".

As described above, when the stereoscopic effect detection value is changed from a given value, the device control amount distribution unit 30 is configured not to change the gain until the stereoscopic effect detection value changes from the present point on the gain line GL by a stereoscopic effect threshold SHM which is a distance to the threshold line SHL1 or SHL2 and reaches the threshold line SHL1 or SHL2.

As described above, the imaging apparatus 1 does not change the gain when the stereoscopic effect detection value changes a little, thereby preventing the change of brightness of a screen every time the stereoscopic effect of the scene changes a little when the viewer sees images and performing natural screen display.

Additionally, the threshold lines SHL1 and SHL2 are set so as to gradually extend in the right direction and the left direction respectively with respect to the gain line GL as the stereoscopic effect detection value is increased. Therefore, the stereoscopic effect threshold SHM is increased as the stereoscopic effect detection value is increased.

As described above, the imaging apparatus 1 can minutely change the brightness of the screen in accordance with small variation of the stereoscopic effect in the case where the stereoscopic effect is small by changing the gain in accordance with little variation of the stereoscopic effect detection value as compared with the case where the stereoscopic effect is large.

The imaging apparatus 1 is also configured not to change the gain unless the stereoscopic effect detection value changes to a certain degree when the stereoscopic effect is large.

The gain is larger when the stereoscopic effect is large as compared with the case where the stereoscopic effect is small, therefore, the residual noise is also higher when the stereoscopic effect is large.

When the gain is minutely changed in accordance with little variation of the stereoscopic effect when the stereoscopic effect is large, noise included in images to be displayed will minutely change, therefore, the viewer is liable to feel flicker when seeing images.

In response to this, the imaging apparatus 1 does not change the gain unless the stereoscopic effect detection value varies to a certain degree when the stereoscopic effect is large, which allows the viewer to see images with little flicker.

[1-6. Switching Between the Single-Eye Imaging Mode and the Compound-Eye Imaging Mode]

As described above, the imaging apparatus 1 is configured to switch between the single-eye imaging mode and the compound-eye imaging mode by operating the imaging switching unit 6.

In the embodiment, when a simultaneous display mode is selected by user's operation through the operation unit 3 in the state of presently performing the single-eye imaging, the system controller 2 operates the left-eye imaging unit LIF1 to thereby store the left-eye image data DSB2 in the memory 5 in addition to the right-eye image data DSA2.

Figure 9:
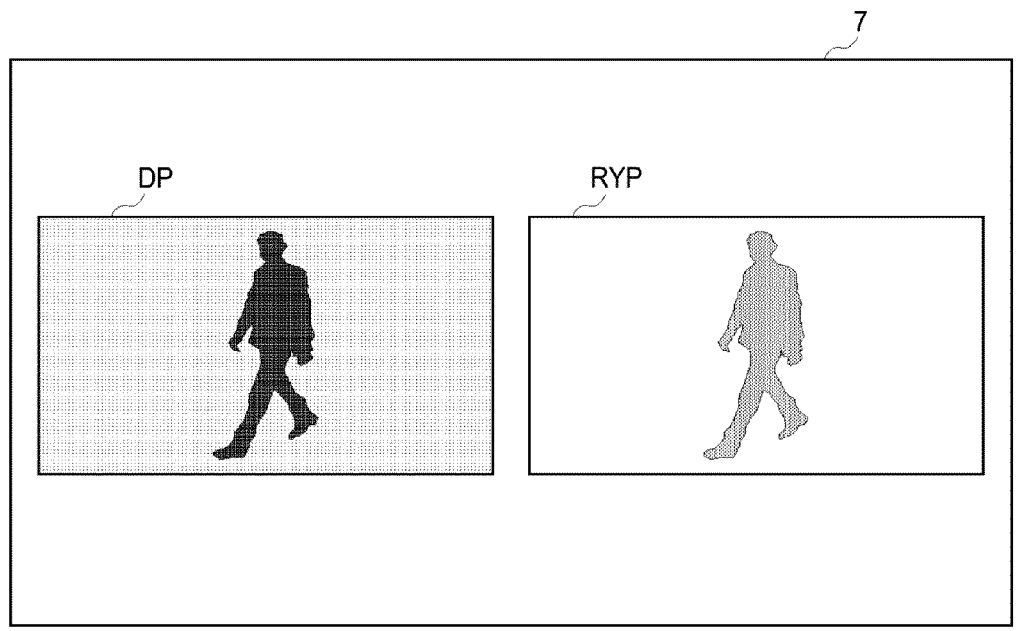
FIG. 9 is a rough diagram showing monitor display in a simultaneous display mode according to the first embodiment.

The system controller 2 also reads out the right-eye image data DSA2 from the memory 5 and transmits the data to the monitor 7, thereby displaying the right-eye image RYP on a right portion of the monitor 7 as shown in FIG. 9.

The system controller 2 further reads out the right-eye image data DSA2 and the left-eye image data DSB2 from the memory 5 and combines the images in the image combination unit 19, thereby generating the combined image data DM.

The system controller 2 controls the image combination unit 19 to transmit the combined image data DM to the monitor 7, thereby displaying a combined image DP (FIG. 9) on a left portion of the monitor 7.

As described above, the system controller 2 is configured to display the right-eye image RYP and the combined image DP side by side on the same screen when the simultaneous display mode is selected in the single-eye imaging mode.

On the other hand, when the simultaneous display mode is selected in the compound-eye imaging mode, the system controller 2 reads out the right-eye image data DSA2 and the combined image data DM from the memory 5 and transmits the data to the monitor 7, thereby displaying the right-eye image RYP (FIG. 9) on the right portion of the monitor 7 and displaying the combined image DP on the left portion respectively.

As described above, the system controller 2 is configured to display the right-eye imaging RYP and the combined image DP side by side on the same screen when the simultaneous display mode is selected also in the compound-eye imaging mode.

As described above, the gain is set to be lower in the compound-eye imaging mode as compared with the case of the single-eye imaging mode, therefore, when the user switches the mode from the single-eye imaging mode to the compound-eye imaging mode, the screen display seen by the viewer may be too dark based on the generated combined image data DM.

Conversely, the gain is set to be higher in the single-eye imaging mode as compared with the case of the compound-eye imaging mode, therefore, when the user switches the mode from the compound-eye imaging mode to the single-eye imaging mode, the screen display seen by the viewer may be too bright based on the generated right-eye image RYP.

In response to this, when the user selects the simultaneous display mode, the system controller 2 displays both the right-eye image RYP in the single-eye imaging mode and the combined image DP in the compound-eye imaging mode on the monitor 7 at the same time in the embodiment.

Thus, the imaging apparatus 1 can present the user with the screen display shown by the generated image data in advance when the user switches between the single-eye imaging mode and the compound-eye imaging mode.

As a result, what screen will be displayed when switching the present imaging mode can be recognized by the user before switching the imaging mode, therefore, the user can adjust the gain in the imaging apparatus 1 so that the screen display will have appropriate brightness.

[1-7. Operations and Effects]

In the above configuration, the imaging apparatus 1 sets the gain maximum value in the compound-eye imaging mode to be lower than the gain maximum value in the single-eye imaging mode.

As the viewer sees the same residual noise by right and left eyes even when residual noise is included in the right-eye image data DSA2 generated by the single-eye imaging, the viewer does not feel flicker.

On the other hand, the viewer sees different residual noise by right and left eyes when the residual noise is included in the combined image data DM generated by the compound-eye imaging, therefore, the viewer feels flicker.

In response to this, the gain maximum value of the compound-eye imaging mode is set to be lower than the gain maximum value of the single-eye imaging mode in the embodiment. Therefore, the imaging apparatus 1 amplifies image signals to the gain maximum value in the compound-eye imaging mode to a degree not exceeding the allowable noise level of the compound-eye imaging mode which is lower than the single-eye imaging mode, thereby brightening the image as well as generating image data in which noise is reduced and stereoscopic effect can be felt.

In the imaging apparatus 1, the gain maximum value used when the stereoscopic effect is small is set to be lower than the gain maximum value used when the stereoscopic effect is large in the compound-eye imaging mode.

When the stereoscopic effect of the scene being imaged is large, the viewer can see the scene in a state of not being directly affected by noise having distribution in the depth direction without impairing stereoscopic effect even when some residual noise is included in the combined image data DM.

On the other hand, when stereoscopic effect of the scene being imaged is small, it is difficult for the viewer to feel stereoscopic effect when residual noise is included in the combined image data DM because the viewer sees the image as if the stereoscopic effect of the image is buried in noise having distribution in the depth direction.

In response to this, the gain maximum value used when the stereoscopic effect is small is set to be lower than the gain maximum value used when the stereoscopic effect is large in the compound-eye imaging mode in the embodiment. Therefore, the imaging apparatus 1 amplifies the digital image signals to the gain maximum value used when stereoscopic effect is small to a degree not exceeding the allowable noise level used when stereoscopic effect is small which is lower than the case of large stereoscopic effect, thereby brightening the image as well as generating image data in which noise is reduced and stereoscopic effect can be felt.

According to the above configuration, the imaging apparatus 1 is configured to switch between the single-eye imaging mode of using the right-eye imaging unit RIF1 in which the analog image signal ASA1 obtained by imaging the object by the imaging device 12A is amplified in the amplifier 20A with the gain lower the given gain maximum value and a compound-eye imaging mode of imaging the object by the right-eye imaging unit RIF1 and the left-eye imaging unit LIF1. The imaging apparatus 1 also sets the gain maximum value to be lower when imaging the object by the compound-eye imaging as compared with the case of imaging the object by the single-eye imaging under control by the system controller 2.

Accordingly, the imaging apparatus 1 can reduce noise seen by the viewer at the time of seeing images in stereoscopic vision by suppressing amplification of image signals in the compound-eye imaging mode so as not to exceed the allowable noise level of the compound-eye imaging mode which is lower than the case of the single-eye imaging mode, therefore, high-quality image data in which image quality at the time of imaging in dark places, brightness and perception of stereoscopic effect are well balanced can be generated.

2. Second Embodiment

[2-1. Configuration of an Imaging Apparatus]

An imaging apparatus 101 according to a second embodiment shown in FIG. 1 is configured approximately in the same manner as the imaging apparatus 1 according to the first embodiment except that a system controller 102 and digital signal processing units 117A and 117B are different from the system controller 2 and the digital signal processing units 17A and 17B in the imaging apparatus 1 according to the first embodiment.

Figure 10:
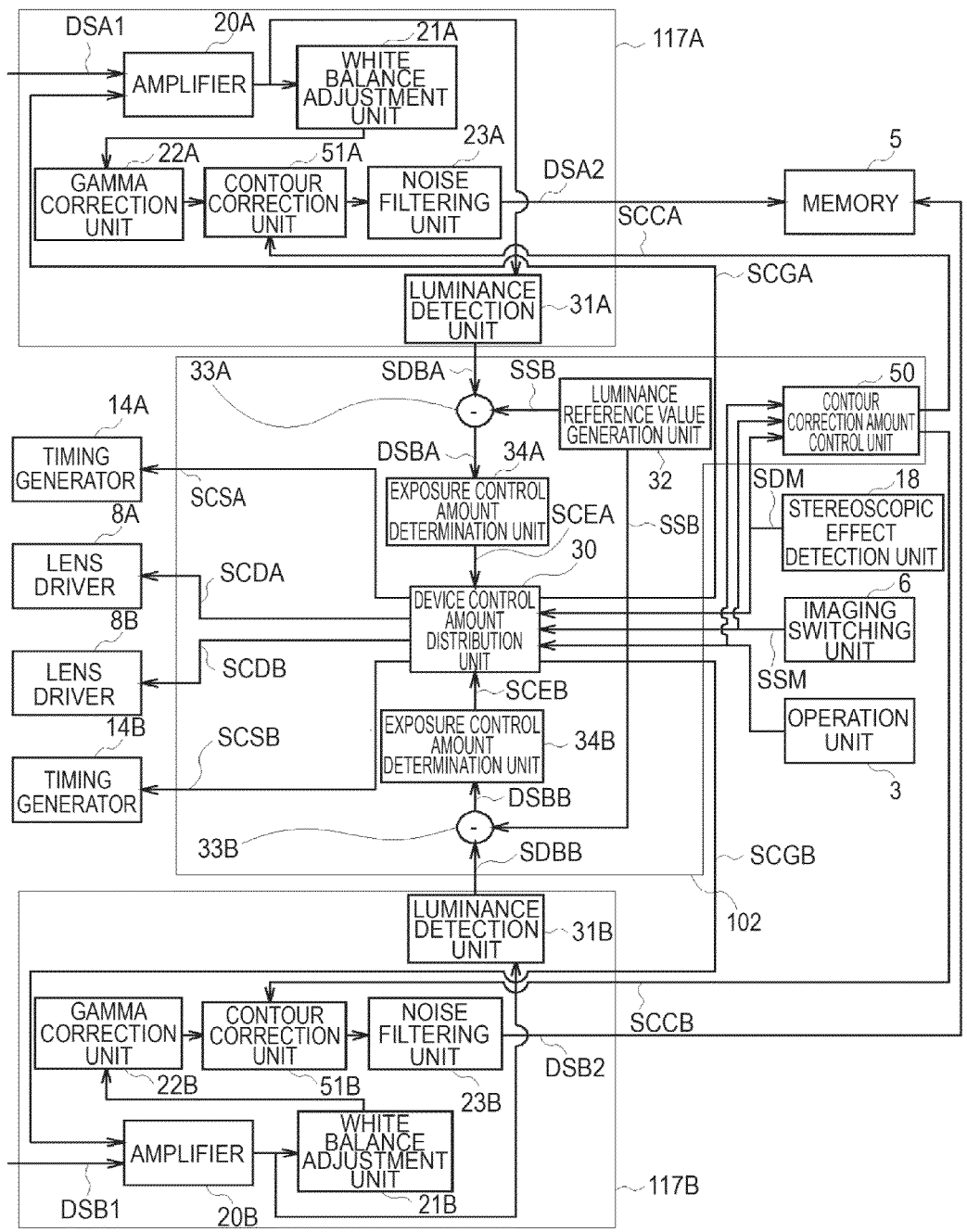
FIG. 10 is a rough diagram showing configuration of a digital signal processing unit and a system controller according to the second embodiment.

The system controller 102 according to the second embodiment shown in FIG. 10 is configured approximately in the same manner as the system controller 2 according to the first embodiment except a point that a contour correction amount control unit 50 is added to the system controller 102.

The digital signal processing units 117A and 117B according to the second embodiment are configured approximately in the same manner as the digital signal processing units 17A and 17B according to the first embodiment except a point that contour correction units 51A and 51B are added.

The imaging apparatus 101 (FIG. 1) operates the configuration of a single-eye imaging system 101A including a right-eye imaging unit RIF2 in the single-eye imaging mode as well as operates the configuration of a compound-eye imaging system 101B including a right-eye imaging unit RIF2 and a left-eye imaging unit LIF2 in the compound-eye imaging mode in the same manner as the imaging apparatus 1.

The contour correction units 51A and 51B (FIG. 10) are configured to acquire an contour correction amount indicating to what degree contour emphasis is performed and to perform contour correction processing in accordance with the contour correction amount by receiving contour correction signals SCCA and SCCB from a contour correction amount control unit 50.

The contour correction amount control unit 50 changes the contour correction amount in accordance with either the compound-eye imaging mode or the single-eye imaging mode indicated by the imaging switching signal SSM when receiving the imaging switching signal SSM from the imaging switching unit 6.

The contour correction amount control unit 50 changes the contour correction amount based on the stereoscopic effect detection signal SDM when acquiring the stereoscopic effect detection signal SDM from the stereoscopic effect detection unit 18.

Incidentally, the contour correction amount control unit 50 is also configured to control the contour correction amount in accordance with user's operation through the operation unit 3.

When an object is imaged by the right-eye imaging unit RIF2 (FIG. 1), the digital signal processing unit 117A inputs the digital image signal DSA1 in the contour correction unit 51A through the amplifier 20A, the white balance adjustment unit 21A and the gamma correction unit 22A.

The contour correction unit 51A performs contour correction processing with respect to the digital image signal DSA1 under control by the contour correction amount control unit 50 and transmits the signal to the noise filtering unit 23A.

The noise filtering 23A reduces noise included in the digital image signal DSA1 and transmits the signal to the memory 5 as the right-eye image data DSA2.

On the other hand, when an object is imaged by the left-eye imaging unit LIF2 (FIG. 1), the digital signal processing unit 117B inputs the digital image signal DSB1 to the contour correction unit 51B through the amplifier 20B, the white balance adjustment unit 21B and the gamma correction unit 22B in the same manner as the digital signal processing unit 117A.

The contour correction unit 51B and the noise filtering unit 23B execute the same processing as the contour correction unit 51A and the noise filtering unit 23A and transmit the left-eye image data DSB2 to the memory 5.

[2-2. Contour Correction Processing]
[2-2-1. Contour Correction Processing in the Single-Eye Imaging Mode]

When the single-eye imaging is designated by user's operation through the imaging switching unit 6, the contour correction unit 51A executes contour correction processing in the single-eye imaging mode which will be described below, thereby performing the contour correction processing with respect to the digital image signal DSA1.

The contour correction amount control unit 50 sets the contour correction amount to a single-eye contour correction amount and transmits the contour correction signal SCCA indicating the contour correction amount to the contour correction unit 51A.

Figure 11:
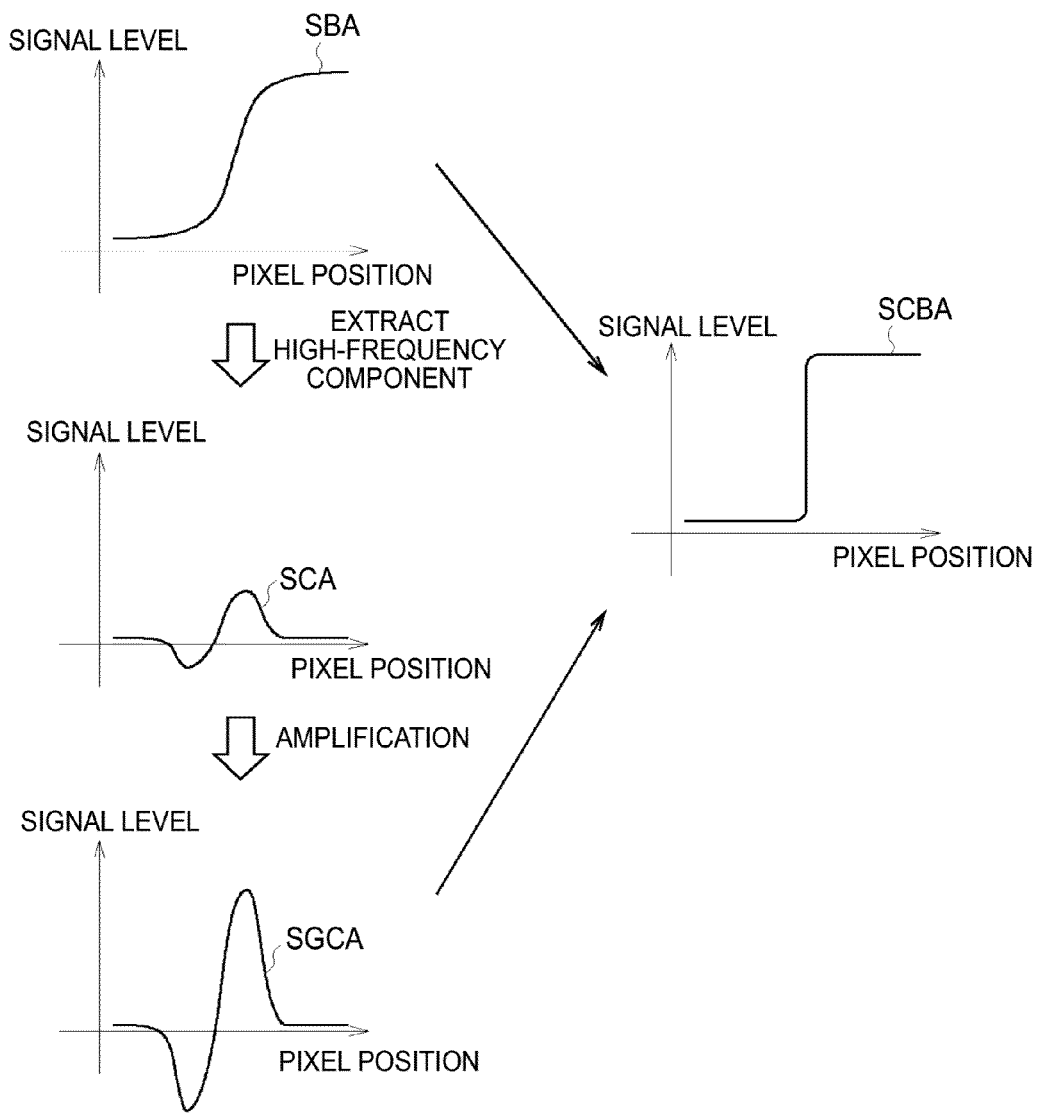
FIG. 11 is a rough diagram showing contour correction processing in the single-eye imaging mode.

The contour correction unit 51A extracts a luminance signal SBA shown in FIG. 11 from the digital image signal DSA1.

The luminance signal SBA before the contour correction processing is performed gently changes in the signal level with respect to variation of a pixel position in a given line of the digital image signal DSA1 as shown in FIG. 11. An Image shown by the image signal including such luminance signal will be the image in which the contour gently changes.

The contour correction unit 51A performs given signal processing with respect to the luminance signal SBA to extract a high-frequency component of the luminance signal SBA as a correction signal SCA.

The contour correction unit 51A also amplifies the correction signal SCA with a contour correction gain corresponding to the contour correction amount to generate an amplification correction signal SGCA. Here, the contour correction amount 51A is configured to increase the contour correction gain as the contour correction amount indicated by the contour correction signal SCCA acquired from the contour correction amount control unit 50 is increased (namely, the degree of emphasizing the contour is increased).

The contour correction unit 51A further adds the luminance signal SBA to the amplification correction signal SGCA to generate a corrected luminance signal SCBA. Variation of the corrected luminance signal SCBA in the signal level is steep as compared with the luminance signal SBA.

The contour correction unit 51A adds the amplification correction signal SGCA obtained by amplifying the correction signal SCA extracted from the luminance signal SBA with the contour correction gain corresponding to the contour correction amount to the luminance signal SBA to convert the luminance signal SBA included in the digital image signal DSA1 into the corrected luminance signal SCBA.

Accordingly, the contour correction unit 51A can make a correction so as to emphasis the contour of the image to be displayed based on the digital image signal DSA1.

[2-2-2. Contour Correction Processing in the Compound-Eye Imaging Mode]

On the other hand, when the compound-eye imaging is designated by user's operation through the imaging switching unit 6 (FIG. 10), the contour correction units 51A and 51B execute contour correction processing in the compound-eye imaging mode described below to thereby perform the contour correction processing with respect to the digital image signals DSA1 and DSB1. The contour correction control amount control amount 50 adjusts the contour correction amount so as to correspond to the stereoscopic effect in the compound-eye imaging mode.

[2-2-2-1. Contour Correction Processing in the Case of Large Stereoscopic Effect]

The contour correction control amount correction unit 50 transmits the contour correction signals SCCA and SCCB indicating the contour correction amount which is lower than the single-eye contour correction amount to the contour correction units 51A and 51B respectively when the compound-eye imaging is designated by the imaging switching unit 6 and it is determined that the stereoscopic effect is large by the stereoscopic effect detection unit 18.

The following explanation will be made on the assumption that the stereoscopic effect detection value has reached a given maximum value and the stereoscopic effect is maximum. In this case, the contour correction control amount correction unit 50 determines the compound-eye contour correction amount maximum value indicating the maximum contour correction amount in the compound-eye imaging mode as the contour correction amount.

Figure 12:
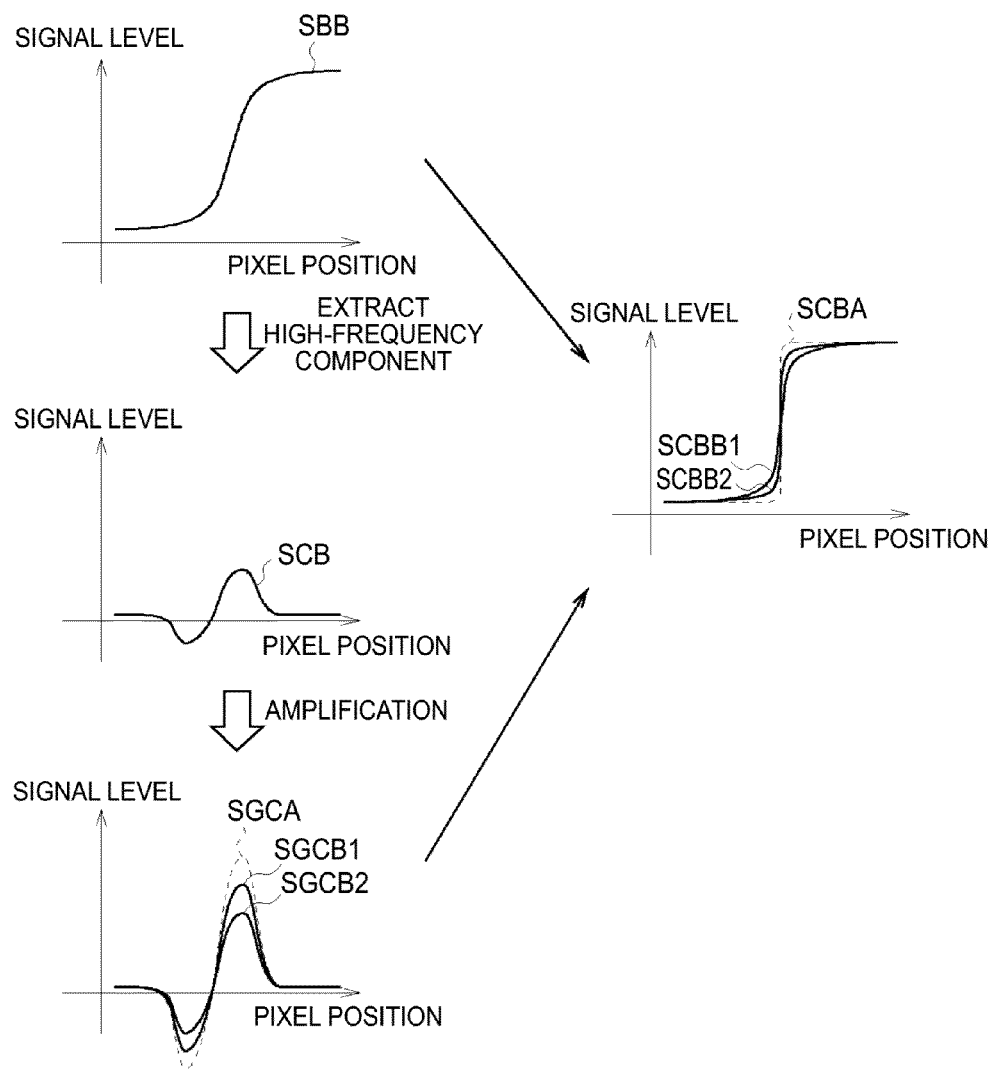
FIG. 12 is a rough diagram showing contour correction processing in the compound-eye imaging mode.

The contour correction units 51A and 51B extract a luminance signal SBB shown in FIG. 12 from the digital image signals DSA1 and DSB1 and perform given signal processing to the luminance signal SBB, then, extract a high-frequency component of the luminance signal SBB as a correction signal SCB.

The contour correction units 51A and 51B amplify the correction value SCB with the contour correction gain which is smaller than the case of the single-eye imaging mode as well as maximum in the compound-eye imaging mode in accordance with the compound-eye contour correction amount maximum value to thereby generate an amplification correction signal SGCB1.

As shown in FIG. 12, the amplification correction signal SGCB1 has smaller amplitude than the amplification correction signal SGCA.

Subsequently, the contour correction units 51A and 51B add the luminance signal SBB to the amplification correction signal SGCB1 to thereby generate a corrected luminance signal SCBB1. Variation of the corrected luminance signal SCBB1 in the signal level is steep as compared with the luminance signal SBB.

Variation of the corrected luminance signal SCBB1 in the signal level is gentle as compared with the corrected luminance signal SCBA in the single-eye imaging mode. Accordingly, the contour correction units 51A and 51B are configured to reduce the degree of contour correction with respect to the digital image signals DSA1 and DSB1 to be smaller than the case of the single-eye imaging mode when the stereoscopic effect is maximum in the compound-eye imaging mode.

As described above, the contour correction units 51A and 51B amplify the correction signal SCB with the contour correction gain corresponding to the compound-eye contour correction amount maximum value when the stereoscopic effect is maximum.

The contour correction amount used when the stereoscopic effect is maximum in the compound-eye imaging mode is the compound-eye contour correction amount maximum value, which is smaller than the single-eye contour correction amount as the contour correction amount in the single-eye imaging mode.

[2-2-2-2. Contour Correction Processing in the Case of Small Stereoscopic Effect]

On the other hand, the contour correction amount control unit 50 transmits the contour correction signals SCCA and SCCB indicating the contour correction amount which is lower than the single-eye contour correction amount as well as lower than the compound-eye contour correction amount maximum value to the contour correction units 51A and 51B respectively when the compound-eye imaging is designated by the imaging switching unit 6 and it is determined that the stereoscopic effect is small by the stereoscopic effect detection unit 18.

The following explanation will be made on the assumption that the stereoscopic effect detection value has reached a given minimum value and the stereoscopic effect is minimum. In this case, the contour correction control amount correction unit 50 determines the compound-eye contour correction amount minimum value indicating the minimum contour correction amount in the compound-eye imaging mode as the contour correction amount.

In this case, the contour correction units 51A and 51B amplify the correction value SCB with the contour correction gain which is smaller than the case of the single-eye imaging mode as well as minimum in the compound-eye imaging mode in accordance with the compound-eye contour correction amount minimum value to thereby generate an amplification correction signal SGCB2.

As shown in FIG. 12, the amplification correction signal SGCB2 has smaller amplitude than the amplification correction signal SGCA as well as the amplification correction signal SGCB1.

Subsequently, the contour correction units 51A and 51B add the luminance signal SBB to the amplification correction signal SGCB2 to thereby generate a corrected luminance signal SCBB2. Variation of the corrected luminance signal SCBB2 in the signal level is steep as compared with the luminance signal SBB.

Variation of the corrected luminance signal SCBB2 in the signal level is much gentler than the corrected luminance signal SCBB1 in the compound-eye imaging mode.

Accordingly, the contour correction units 51A and 51B are configured to reduce the degree of contour correction with respect to the digital image signals DSA1 and DSB1 to be further smaller than the case where the stereoscopic effect is maximum in the compound-eye imaging mode.

As described above, the contour correction units 51A and 51B amplify the correction signal SCB with the contour correction gain corresponding to the compound-eye contour correction amount minimum value when the stereoscopic effect is minimum.

The contour correction amount used when the stereoscopic effect is minimum in the compound-eye imaging mode is the compound-eye contour correction amount minimum value, which is smaller than the single-eye contour correction amount as well as compound-eye contour correction amount maximum value.

The cases where the stereoscopic effect is minimum and maximum in the compound-eye imaging mode have been explained as the above. When the stereoscopic effect is between the minimum and the maximum, the contour correction amount control unit 50 sets the contour correction amount to a range of a compound-eye imaging mode contour correction amount range which is between the compound-eye contour correction amount minimum value and the compound-eye contour correction amount maximum value.

As described above, the contour correction units 51A and 51B extract the high-frequency component of the luminance signal SBB as the correction signal SCB after the luminance signal SBB is extracted from the digital image signals DSA1 and DSB1 and amplify the correction signal SCB.

Thus, the contour correction units 51A and 51B also amplify noise included in the digital image signals DSA1 and DSB1 when amplifying the correction signal SCB.

Therefore, it may be difficult that the noise filtering units 23A and 23B completely remove noise. Accordingly, noise may remain in the right-eye image data DSA2 and the left-eye image data DSB2.

As described above, the allowable residual noise amount is smaller in the compound-eye imaging mode as compared with the case of the single-eye imaging mode.

Accordingly, the contour correction amount control unit 50 is configured to reduce the contour correction amount in the compound-eye imaging mode to be smaller than the contour correction amount in the single-eye imaging mode.

As the result, the imaging apparatus 101 suppresses the contour correction amount to the compound-eye contour correction amount maximum value in the compound-eye imaging mode to a degree not exceeding the allowable noise level of the compound-eye imaging mode which is lower than the single-eye imaging mode, thereby performing contour correction processing of the digital image signals DSA1 and DSB1 and improving resolution, as well as generating image data in which noise is reduced and the stereoscopic effect can be felt.

Additionally, the allowable residual noise amount in the case of small stereoscopic effect is smaller than the case of large stereoscopic effect as described above.

On the other hand, the contour correction amount control unit 50 uses the compound-eye contour correction amount maximum value as the contour correction amount when the stereoscopic effect is maximum and uses the compound-eye contour correction amount minimum value which is lower than the compound-eye contour correction amount maximum value as the contour correction amount when the stereoscopic effect is minimum.

As the result, the imaging apparatus 101 suppresses the contour correction amount to a degree not exceeding the allowable noise level in the case of small stereoscopic effect which is lower than the case of large stereoscopic effect, thereby performing contour correction processing of the digital image signals DSA1 and DSB1 and improving resolution, as well as generating image data in which noise is reduced and the stereoscopic effect can be felt.

[2-3. Variation of the Contour Correction Amount with Respect to Variation of Stereoscopic Effect]

As described above, the system controller 102 changes the contour correction amount within the range of a compound-eye imaging mode contour correction amount range PCR (FIG. 13) which is between the compound-eye contour correction amount minimum value and the compound-eye contour correction amount maximum value in accordance with stereoscopic effect in the compound-eye imaging mode.

Variation of the contour correction amount with respect to variation of the stereoscopic effect detection value in the compound-eye imaging mode will be explained below. As shown by the relation between the stereoscopic effect detection value and the contour correction amount shown in FIG. 13, the contour correction amount is gradually increased along a contour correction line CCL from the compound-eye contour correction amount minimum value used when the stereoscopic effect is the minimum to the compound-eye contour correction amount maximum value used when the stereoscopic effect is the maximum.

Here, for example, when the stereoscopic effect detection value is increased in a state where the present contour correction amount is at a point "P10", the contour correction amount control unit 50 does not increase the contour correction amount until the stereoscopic effect detection value reaches a point "P11" and increases the contour correction amount along a threshold line SHL11 when reaching the point "P11".

Similarly, when the stereoscopic effect detection value is reduced in a state where the contour correction amount is at the point "P10", the contour correction amount control unit 50 does not reduce the contour correction amount until the stereoscopic effect detection value reaches a point "P12" and reduces the contour correction amount along a threshold line SHL12 when reaching the point "P12".

As described above, when the stereoscopic effect detection value is changed from a given value, the contour correction amount control unit 50 is configured not to change the contour correction amount until the stereoscopic effect detection value changes from the present point on the contour line CCL by the stereoscopic effect threshold SHM which is a distance to the threshold line SHL11 or SHL12 and reaches the threshold line SHL11 or SHL12.

As described above, the imaging apparatus 101 does not change the contour correction amount when the stereoscopic effect detection value changes a little, thereby preventing the change in sight of an object contour displayed on the screen every time the stereoscopic effect of the scene changes a little when the viewer sees images and performing natural screen display.

[2-4. Switching Between the Single-Eye Imaging Mode and the Compound-Eye Imaging Mode]

The imaging apparatus 101 selects the simultaneous display mode by operating the operation unit 3 in the same manner as the first embodiment.

Figure 14:
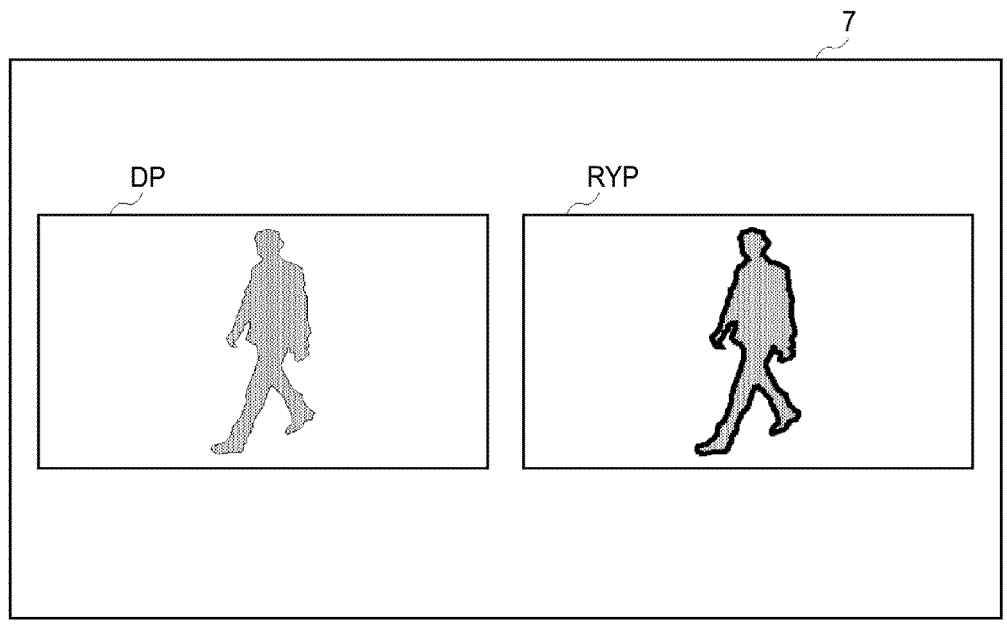
FIG. 14 is a rough diagram showing monitor display in a simultaneous display mode according to the second embodiment.

The system controller 102 displays the right-eye image RYP on the right portion of the monitor 7 as well as displays the combined image DP on the left portion as shown in FIG. 14. In this case, the contour of the image is emphasized in the right-eye image RYP as compared with the combined image DP.

Thus, the imaging apparatus 101 can present the user with the screen display shown by the generated image data in advance when the user switches between the single-eye imaging mode and the compound-eye imaging mode.

As a result, what screen will be displayed when switching the present imaging mode can be recognized by the user before switching the imaging mode, therefore, the user can adjust the contour correction amount in the imaging apparatus 101 so that appropriate contour correction is performed to the object displayed on the screen.

[2-5. Operations and Effects]

In the above configuration, the imaging apparatus 101 sets the contour correction amount in the compound-eye imaging mode to be lower than the contour correction amount in the single-eye imaging mode.

Accordingly, the imaging apparatus 101 suppresses the contour correction amount to a degree not exceeding the allowable noise level of the compound-eye imaging mode which is lower than the single-eye imaging mode, thereby performing contour correction processing and improving resolution as well as generating image data in which noise is reduced and the stereoscopic effect can be felt.

In the compound-eye imaging mode, the imaging apparatus 101 applies the compound-eye contour correction amount maximum value as the contour correction amount when the stereoscopic effect is maximum and applies the compound-eye contour correction amount minimum value which is lower than the compound-eye contour correction amount maximum value as the contour correction amount when the stereoscopic effect is minimum.

Accordingly, the imaging apparatus 101 suppresses the contour correction amount to a degree not exceeding the allowable noise level of the case of small stereoscopic effect which is lower than the case of large stereoscopic effect, thereby performing contour correction processing and improving resolution as well as generating image data in which noise is reduced and the stereoscopic effect can be felt.

According to the above configuration, the imaging apparatus 101 is configured to switch between the single-eye imaging mode of using the right-eye imaging unit RIF1 in which the contour correction processing is performed to the digital image signal DSA1 obtained by imaging an object by the imaging device 12A with a given contour correction amount in the contour correction unit 51A and a compound-eye imaging mode of imaging the object by the right-eye imaging unit RIF1 and the left-eye imaging unit LIF1. The imaging apparatus 101 also sets the contour correction value to be lower when imaging the object by the compound-eye imaging as compared with the case of imaging the object by the single-eye imaging under control by the system controller 102.

Accordingly, the imaging apparatus 101 can reduce noise seen by the viewer at the time of viewing images in stereoscopic vision by suppressing the degree of contour correction processing with respect to image signals in the compound-eye imaging mode so as not to exceed the allowable noise level of the compound-eye imaging mode which is lower than the case of the single-eye imaging mode, therefore, high-quality image data in which image quality, resolution and perception of stereoscopic effect are well balanced.

3. Other Embodiments

In the above embodiments, the case of detecting stereoscopic effect by calculating the difference vector DDIS based on the right-eye image RYP and the left-eye image LYP has been described.

The present disclosure is not limited to the above, and it is also preferable that the stereoscopic effect is determined to be large when the optical-axis interval is wide as well as the stereoscopic effect is determined to be small when the optical-axis interval is narrow based on the optical-axis interval. In this case, an optical-axis interval measurement sensor ADS formed by, for example, a linear encoder is attached to each of the right-eye lens barrel 13A and the left-eye lens barrel 13B as shown in FIGS. 3A and 3B to thereby calculate the interval (namely, the optical axis of object's light) between the right-eye lens barrel 13A and the left-eye lens barrel 13B.

It is also preferable that the stereoscopic effect is determined to be large when the convergence angle is wide as well as the stereoscopic effect is determined to be small when the convergence angle is narrow based on the convergence angle. In this case, two convergence angle measurement sensors CAS formed by, for example, the linear encoder are attached to each of the right-eye lens barrel 13A and the left-eye lens barrel 13B as shown in FIGS. 4A and 4B to thereby calculate the convergence angle by calculating the difference between an interval of end portions of the right-eye lens barrel 13A and the left-eye lens barrel 13B and an interval of the other end portions thereof.

It is further preferable that the optical-axis interval is combined with the convergence angle and that it is determined that the stereoscopic effect is further increased when, for example, the optical-axis interval is increased as well as the convergence angle is increased.

The optical-axis interval measurement sensor and the convergence angle measurement sensor are not limited to the linear encoder, and it is also preferable that the optical-axis interval and the convergence angle are calculated by various sensors such as a rotary encoder and a potentiometer.

The imaging apparatus 1 including the right-eye imaging unit and the left-eye imaging unit has also been described in the above embodiments.

However, the present disclosure is not limited to the above and it is also preferable that the present disclosure is applied to an imaging apparatus having, for example, three of more imaging units. Also in this case, it is desirable that the gain or the contour correction amount with respect to image signals is reduced to be lower in the case of performing imaging by two or more imaging units as compared with the case of performing imaging by one imaging unit.

The case where amplification processing is performed in the amplifiers 20A and 20B and the contour correction processing is performed in the contour correction units 51A and 51B provided in the digital signal processing units 117A and 117B has been described in the above embodiments.

The present disclosure is not limited to the above, and it is also preferable that the amplification processing or the contour correction processing is performed at units other than the digital signal processing units 117A and 117B, for example, at the analog signal processing units 15A and 15B.

Further in the above embodiments, the case where the right-eye image RYP and the combined image DP are displayed side by side at right and left on the monitor 7 at the time of the simultaneous display mode.

The present disclosure is not limited to the above. The right eye image RYP and the combined image DP can be displayed on the monitor 7 in various manner, for example, the right-eye image RYP is displayed on the monitor 7 in a large size and the combined image DP is displayed in a small size so as to overlap with the right eye image RYP at a corner when performing the single-eye imaging at present.

In the above second embodiment, the case where the correction signal SCA or SCB is extracted from the luminance signal SBA or SBB and the correction signal SCA or SCB is amplified to thereby form the amplification correction signal SGCA or SGCB, which will be added to the luminance signal SBA or SBB has been described.

The present disclosure is not limited to the above, and it is also preferable that limitation is imposed so that the amplification correction signal SGCA or SGCB is not increased to more than a given amplitude, then, the amplification correction signal SGCA or SGCB with smaller amplitude than the original amplification correction signal SGCA or SGCB is added to the luminance signal SBA or SBB.

In the above case, the higher a limitation value as limitation is set to be, the steeper the rising of the signal level of the corrected luminance signal becomes.

Further in the above embodiment, the case where the imaging switching unit 6 as a determination unit and the device control amount distribution unit 30 as a gain maximum value control unit compose the system controller 2 and the imaging switching unit 6 as a control device has been described.

The present disclosure is not limited to the above and it is also preferable that the determination unit formed by other various configurations and the gain maximum value control unit compose the control device.

Further in the above embodiment, the case where the imaging switching unit 6 as a determination unit and the contour correction amount control unit 50 as a contour correction amount control unit compose the system controller 102 and the imaging switching unit 6 as a control device has been described.

The present disclosure is not limited to the above and it is also preferable that the determination unit formed by other various configurations and the contour correction amount control unit compose the control device.

The present disclosure can be applied to an imaging apparatus including plural imaging units having plural imaging devices.

The present disclosure contains subject matter related to that disclosed in Japanese Priority Patent Application JP 2010-293359 filed in the Japan Patent Office on Dec. 28, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A control device comprising:
    a determination unit configured to determine which mode is designated in a single-eye imaging mode in which imaging is performed by using a single imaging unit configured to obtain an image signal by imaging an object by an imaging device and a compound-eye imaging mode in which imaging is performed by using plural imaging units; and
    a gain maximum value control unit configured to change a gain maximum value which is a maximum value of a gain of the image signal based at least in part on a determination result determined by the determination unit,
    wherein, when it is determined by the determination unit that the compound-eye imaging mode is designated, the gain maximum value control unit reduces the gain maximum value to be lower than in a case of the single-eye imaging mode.

2. The control device according to claim 1, further comprising:
    a stereoscopic effect detection unit configured to detect a stereoscopic effect of the object, wherein the gain maximum value control unit is configured to increase the gain maximum value as the stereoscopic effect detected by the stereoscopic effect detection unit is increased.

3. The control device according to claim 2, wherein, in a case where variation of the stereoscopic effect is within a given threshold value when the stereoscopic effect varies, the gain maximum value control unit is configured to maintain the gain maximum value to be constant.

4. The control device according to claim 2, wherein the gain maximum value control unit is configured to increase a threshold value as the stereoscopic effect is increased.

5. The control device according to claim 2, wherein the stereoscopic effect detection unit is configured to detect the stereoscopic effect to be larger as a difference between a front-side object parallax vector indicating displacement of a front-side object and a back-side object parallax vector indicating displacement of a back-side object is increased, which are in respective images of a first image generated by one imaging unit and a second image generated by other imaging unit which, are used in the compound-eye imaging mode.

6. The control device according to claim 2, wherein the stereoscopic effect detection unit is configured to detect the stereoscopic effect to be larger as an optical-axis interval between an optical axis of object's light in one imaging unit and an object-axis of object's light in other imaging unit is increased.

7. The control device according to claim 2, wherein the stereoscopic effect detection unit is configured to detect the stereoscopic effect to be larger as a convergence angle made by an optical axis of object's light in one imaging unit and an optical axis of object's light in other imaging unit is increased.

8. The control device according to claim 1, further comprising:
a display control unit configured to display images based at least in part on image signals generated by the plural imaging units on a given display unit,
wherein the display control unit is configured to display a first image based at least in part on a display signal generated by imaging the object in the single-eye imaging mode and a second image based at least in part on an image signal generated by imaging the object in the compound-eye imaging mode.

9. A control method comprising:
determining which mode is designated in a single-eye imaging mode in which imaging is performed by using a single imaging unit configured to obtain an image signal by imaging an object by an imaging device and a compound-eye imaging mode in which imaging is performed by using plural imaging units;
changing a gain maximum value which is a maximum value of a gain of the image signal based on the determination result;
detecting a stereoscopic effect of the object; and
increasing the gain maximum value as the detected stereoscopic effect is increased.

10. A non-transitory computer-readable storage medium having stored thereon, a computer program having at least one code section, said at least one code section being executable by a computer for causing said computer to perform steps comprising:
determining which mode is designated in a single-eye imaging mode in which imaging is performed by using a single imaging unit configured to obtain an image signal by imaging an object by an imaging device and a compound-eye imaging mode in which imaging is performed by using plural imaging units;
changing a gain maximum value which is a maximum value of a gain of the image signal based on the determination result, and
reducing the gain maximum value to be lower than in a case of the single-eye imaging mode when it is determined that the compound-eye imaging mode is designated.

11. A control device comprising:
a determination unit configured to determine which mode is designated in a single-eye imaging mode in which imaging is performed by using a single imaging unit configured to obtain an image signal by imaging an object by an imaging device and a compound-eye imaging mode in which imaging is performed by using plural imaging units; and
a contour correction amount control unit configured to change a contour correction amount for performing contour correction with respect to the image signal based at least in part on the determination result determined by the determination unit,
wherein the contour correction amount control unit is configured to reduce the contour correction amount to be lower when it is determined that the compound-eye imaging mode is designated by the determination unit as compared with case where it is determined that the single-eye imaging mode is designated.

12. The control device according to claim 11, further comprising:
a stereoscopic effect detection unit configured to detect stereoscopic effect of the object,
wherein the contour correction amount control unit increases the contour correction amount as the stereoscopic effect detected by the stereoscopic effect detection unit is increased.

13. The control device according to claim 12, wherein, in a case where variation of the stereoscopic effect is within a given threshold value when the stereoscopic effect varies, the contour correction amount control unit is configured to maintain the contour correction amount to be constant.

14. The control device according to claim 12, wherein the stereoscopic effect detection unit is configured to detect the stereoscopic effect to be larger as difference between a front-side object parallax vector indicating displacement of a front-side object and a back-side object parallax vector indicating displacement of a back-side object is increased, which are in respective images of a first image generated by one imaging unit and a second image generated by other imaging unit which are used in the compound-eye imaging mode.

15. The control device according to claim 12, wherein the stereoscopic effect detection unit is configured to detect the stereoscopic effect to be larger as an optical-axis interval between an optical axis of object's light in one imaging unit and an object-axis of object's light in other imaging unit is increased.

16. The control device according to claim 12, wherein the stereoscopic effect detection unit is configured to detect the stereoscopic effect to be larger as a convergence angle made by an optical axis of object's light in one imaging unit and an optical axis of object's light in other imaging unit is increased.

17. A control method comprising:
determining which mode is designated in a single-eye imaging mode in which imaging is performed by using a single imaging unit configured to obtain an image signal by imaging an object by an imaging device and a compound-eye imaging mode in which imaging is performed by using plural imaging units;

changing a contour correction amount for performing contour correction with respect to the image signal based at least in part on the determination result;

detecting stereoscopic effect of the object; and increasing the contour correction amount as the detected stereoscopic effect is increased.

18. A non-transitory computer-readable storage medium having stored thereon, a computer program having at least one code section, said at least one code section being executable by a computer for causing said computer to perform steps comprising:

determining which mode is designated in a single-eye imaging mode in which imaging is performed by using a single imaging unit configured to obtain an image signal by imaging an object by an imaging device and a compound-eye imaging mode in which imaging is performed by using plural imaging units;

changing a contour correction amount for performing contour correction with respect to the image signal based at least in part on the determination result;

detecting stereoscopic effect of the object; and increasing the contour correction amount as the detected stereoscopic effect is increased.

* * * * *